US011255716B2

(12) United States Patent
Komatsuda et al.

(10) Patent No.: US 11,255,716 B2
(45) Date of Patent: Feb. 22, 2022

(54) ANALYSIS SUPPORT APPARATUS, ANALYSIS SUPPORT METHOD, AND A COMPUTER-READABLE MEDIUM CONTAINING AN ANALYSIS SUPPORT PROGRAM

(71) Applicant: Hitachi, Ltd., Tokyo (JP)

(72) Inventors: Takuya Komatsuda, Tokyo (JP); Takuya Oda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 74 days.

(21) Appl. No.: 16/575,190

(22) Filed: Sep. 18, 2019

(65) Prior Publication Data

US 2020/0158561 A1 May 21, 2020

(30) Foreign Application Priority Data

Nov. 21, 2018 (JP) .............................. JP2018-217888

(51) Int. Cl.
*G01M 13/028* (2019.01)
*G01H 1/00* (2006.01)
*G06N 5/00* (2006.01)

(52) U.S. Cl.
CPC .......... *G01H 1/003* (2013.01); *G01M 13/028* (2013.01); *G06N 5/00* (2013.01)

(58) Field of Classification Search
CPC ......... G01H 1/003; G01H 17/00; G06N 20/00
See application file for complete search history.

(56) References Cited

U.S. PATENT DOCUMENTS

2006/0210141 A1* 9/2006 Kojitani ............... G06K 9/6269
382/141
2020/0019855 A1* 1/2020 Kato ....................... G06F 16/00

FOREIGN PATENT DOCUMENTS

JP           2010-170422 A      8/2010

* cited by examiner

*Primary Examiner* — Mohamed Charioui
*Assistant Examiner* — Christine Y Liao
(74) *Attorney, Agent, or Firm* — Procopio, Cory, Hargreaves & Savitch LLP

(57) ABSTRACT

An analysis support apparatus includes: a feature interpreting section extracting a feature from a target analysis model generated from vibration data and classifying the feature into an abnormality determination feature, or a feature representing a vibration and enabling determining whether abnormality occurs; an abnormality determination range creating section identifying a range being determined to be abnormal of the abnormality determination feature of the target analysis model as an abnormality determination range; a similar model selecting section calculating an overlapping degree indicating how much the abnormality determination ranges of the target analysis model and one or more predetermined reference analysis models overlap and selecting, based on the overlapping degree, a similar analysis model similar to the target analysis model from the reference analysis models; and an abnormality range difference calculating section extracting a difference between the abnormality determination ranges of the target analysis model and the similar analysis model.

12 Claims, 22 Drawing Sheets

FIG. 10

| ID | Abnormality determination feature | Basic form |
|---|---|---|
| 1 | Frequency (Constant) | FFT |
| 2 | Amplitude (Constant) | MAX |
| 3 | Frequency (Time-Series) | STFT, STD |
| 4 | Amplitude (Time-Series) | SPLIT, MAX, STD |

FIG. 11

| ID | Arithmetic process name | Variable name | Creation source variable name |
|---|---|---|---|
| 1 | FFT | freq_data | row_data |
| 2 | train_test_split | test_data | freq_data |
| 3 | select_freq | x1,x2 | test_data |

FIG. 14

| ID | Model ID | Axis name | Axis start point | Axis end point | Abnormality range start point | Abnormality range end point |
|---|---|---|---|---|---|---|
| 1 | 1 | Frequency (Constant) | 20 Hz | - | 10 dB | 30 dB |
| 2 | 1 | Frequency (Constant) | 50 Hz | - | 10 dB | 60 dB |
| 3 | 1 | Amplitude (Constant) | 50 dB | - | - | - |
| 4 | 2 | Amplitude (Constant) | 5 dB | 10 dB | - | - |
| 5 | 3 | Frequency (Constant) | 10 Hz | - | 10 dB | 40 dB |
| 6 | 3 | Frequency (Constant) | 50 Hz | - | 10 dB | 40 dB |

FIG. 15

| Original record ID (340) | Destination record ID (341) | Axial difference (342) |
|---|---|---|
| 1 | 5 | 10 Hz |
| 2 | 6 | - |

FIG. 16

```
1: row_data = load_data("~/data.csv")
2: freq_data = FFT(row_data)
3: train_data, test_data
     = train_test_split(freq_data)
4: x1,x2 = select_freq(train_data)
5: lr = LogisticRegression()
6: lr.fit(x1,x2)
7: lr.predict(test_data)
```

FIG. 21

| | Similarity | Abnormality determination feature | Purpose | Quantitative difference of defective product from non-defective product | Non-defective sample data | Defective sample data |
|---|---|---|---|---|---|---|
| ☐ | 85% | Level (Constant) Level (Time-Series) | Defect determination at motor inspection | Regarding a sound from a defective product, sounds at 20 Hz and 50 Hz are heard louder than a sound from a non-defective product every second. | 0:09 / 0:20 | 0:00 / 0:23 |
| ✓ | 60% | Level (Constant) Magnitude (Constant) | Prediction of malfunction of elevator | A sound of 50 dB or larger is heard from a defective product, whereas a non-defective product emits a sound of approximately 10 dB. | 0:00 / 0:19 | 0:00 / 0:33 |
| ⋮ | ⋮ | ⋮ | ⋮ | ⋮ | ⋮ | ⋮ |

Similar Model list
Abnormality determination feature matching to target model: Level (Constant)
Result: 7 cases

ANALYSIS SUPPORT APPARATUS, ANALYSIS SUPPORT METHOD, AND A COMPUTER-READABLE MEDIUM CONTAINING AN ANALYSIS SUPPORT PROGRAM

This application is based upon and claims the benefit of priority from Japanese Patent Application No. 2018-217888 filed in Japan Patent Office on Nov. 21, 2018, the contents of which are hereby incorporated by reference.

BACKGROUND

The present invention relates to a technology that supports interpretation of an analysis model for analyzing vibration data.

In the manufacturing industry, it has been expected that data (hereinafter, also referred to as "sensor data") collected from a sensor installed in plant equipment is used for reducing maintenance costs and improving productivity. Meanwhile, since an increasing shortage of skilled workers is of concern, automation of operations being performed by skilled workers has been demanded. Coming from such a background, efforts have been made to replicate operations being performed by skilled workers with use of the sensor data for automation.

For example, a motor manufacturing process includes an inspection process of inspecting whether a produced motor is non-defective or defective. In an actual inspection process, a skilled worker starts a motor product and listens to sound emitted from the motor product, thereby determining whether the motor product is non-defective or defective from the sound. To automate such an operation performed by the skilled worker, it has been expected that a determination rule for determining whether the motor is non-defective or defective is established by acquiring the sensor data from the motor with use of a vibration sensor and applying a machine learning technique based on, for example, logistic regression or decision tree to the acquired data.

According to the machine learning technique, the determination rule is established from data that was previously collected (hereinafter, also referred to as "previous data"), so that it is necessary to collect in advance data obtained from a multitude of motor products including defective products with a variety of defect patterns. However, due to a recent improvement in the manufacturing technology, a defect rate of motor products is often lowered. Thus, since the types of defective products for collecting data in advance is reduced, it is of concern that merely a determination rule for detecting some defective products with specific defect patterns is able to be established, but not a determination rule for detecting defective products with any other actually possible defect patterns. Thus, it has been desired that a model that reflects a determination rule is temporarily established by learning the previous data, and then the model is improved, incorporating another determination rule for detecting defects with defect patterns that are not shown by the previous data.

To improve the model to be applicable to other defect patterns, a data analyzing person needs to first recognize defect patterns detectable or defect patterns undetectable by the current model established from the previous data, and next perform model interpretation of extracting a feature for enabling detection of the undetectable defect patterns.

Japanese Patent Laid-Open No. 2010-170422 discloses a technology that enables model interpretation. According to the technology Japanese Patent Laid-Open No. 2010-170422, a candidate value for the number of models is first selected and leaning data is clustered into clusters, the number of which corresponds to the candidate value. Next, respective models are established for the clusters by machine learning and it is evaluated whether the number of models is reasonable with use of the established models. If the number of models is determined to be not reasonable, the process is again performed from the selection of the candidate value for the number of models. Such a series of process allows for creating the suitable number of models for the features of the previous data. Consequently, a model with a high determination accuracy is able to be automatically allocated per feature. With use of such a technology, the data analyzing person is able to understand which model exhibits a high determination accuracy depending on the type of data. For example, the models may be interpreted in such a way that a model A exhibits a high accuracy for a case where a facility has a dehydration temperature of 10 C.° or more and a model B exhibits a high accuracy for a case where another facility has a line speed of 100 m/s or less.

SUMMARY

In a case of applying the technology according to Japanese Patent Laid-Open No. 2010-170422 to analysis of vibration data, a data analyzing person is supposed to recognize that "a model C has a high determination accuracy for a case where a sound pressure of 50 Hz is at 20 dB or less." Such an explanation with a low explainability is not clear for a data analyzing person with poor technical knowledge.

Moreover, since the technology according to Japanese Patent Laid-Open No. 2010-170422 is intended to explain the model on the basis of the previous data, detection of defect patterns related to uncollected data is not taken into consideration.

An object of the present invention is to provide a technology of analyzing vibration data that enables interpretation of a model by clear expression and presentation of information useful for model improvement in consideration of detection of defect pattern related to uncollected data.

According to an aspect of the present disclosure, an analysis support apparatus, which is an analysis support apparatus configured to support data analysis, includes: a feature interpreting section configured to extract a feature from a target analysis model generated on a basis of vibration data and classify the feature into an abnormality determination feature, the abnormality determination feature being a feature that represents a vibration and enables determining whether abnormality occurs; an abnormality determination range creating section configured to identify a range to be determined to be abnormal of the abnormality determination feature of the target analysis model as an abnormality determination range; a similar model selecting section configured to calculate an overlapping degree that indicates how much the abnormality determination range of the target analysis model and an abnormality determination range of each of one or more predetermined reference analysis models overlap and select, on a basis of the overlapping degree, a similar analysis model that is similar to the target analysis model from among the reference analysis models; and an abnormality range difference calculating section configured to extract a difference between the abnormality determination range of the target analysis model and an abnormality determination range of the similar analysis model.

The above aspect of the present disclosure allows for classifying a feature of a target analysis model into an abnormality determination feature, which is a feature that represents vibration and enables determining whether abnormality occurs. Thus, it is possible to interpret the target analysis model by clear expression. Furthermore, by extracting a difference caused in the target analysis model relative to the similar analysis model possibly as a result of data not having been collected, it is possible to obtain information useful for improving the analysis model with consideration of detection of a defect pattern that data related to the pattern is not collected.
related to uncollected data.

BRIEF DESCRIPTION OF THE DRAWINGS

FIG. 10 is a diagram showing data indicating a feature generation process for abnormality determination features stored in a feature generation process storing section 30;

FIG. 11 is a diagram showing a list registered in a variable transformation method storing section 31;

FIG. 14 is a diagram showing an example of data stored in an abnormality determination range storing section 33;

FIG. 15 is a diagram showing an example of data stored in an overlapping record pair storing section 34;

FIG. 16 is a diagram showing a program for creating the analysis model;

FIG. 21 is a diagram showing an example of a screen image that shows a list of similar analysis models according to the present embodiment.

DETAILED DESCRIPTION OF THE EMBODIMENT

The best mode for carrying out the invention will be described in detail with reference to drawings.

Figure 1:
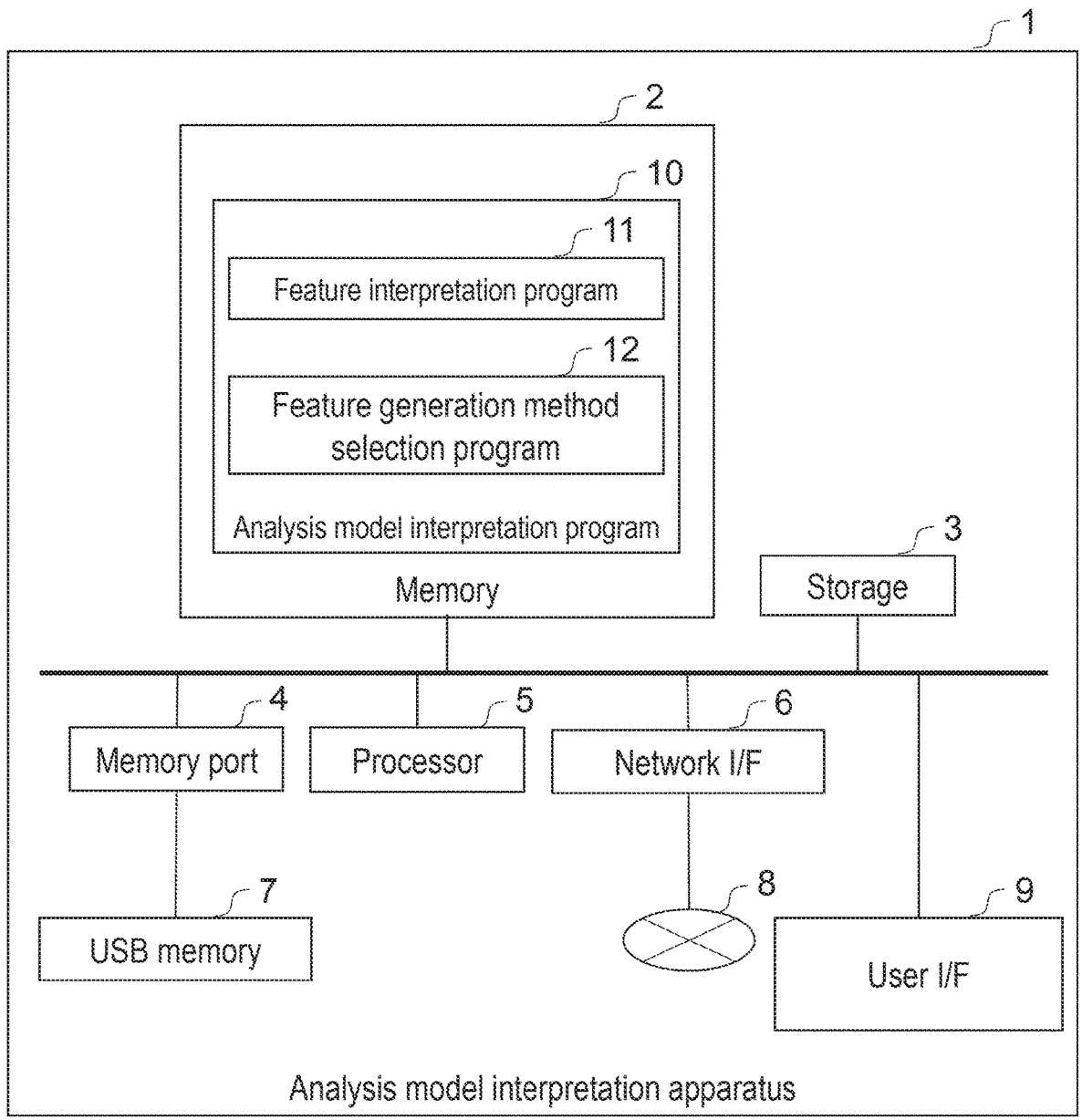
FIG. 1 is a block diagram showing an example of a configuration of an analysis model interpretation apparatus according to the present embodiment.

FIG. 1 is a block diagram showing an example of a configuration of an analysis model interpretation apparatus according to the present embodiment. The analysis model interpretation apparatus is an apparatus for interpreting an analysis model established on the basis of a behavior, or data, obtained from an object to be monitored. A target analysis model may be provided by a user. The analysis model is in the form of a mathematical expression for determining a state of the object to be monitored, that is, for example, whether a product to be monitored is defective. In response to input of numerical data observed and collected by a sensor installed to monitor the product to be monitored and/or numerical data generated by processing the collected numerical data, the analysis model outputs a probability of the product being defective or a determination result of whether the product is defective. Information obtained by interpreting such an analysis model may be used for determining the state of the object to be monitored. In an instance of a motor manufacturing process, it is possible to detect abnormality, such as defective products, by acquiring data of amplitude and frequency indicating vibration of a motor, establishing an analysis model on the basis of the data, and interpreting the analysis model.

An analysis model interpretation apparatus 1 according to the present embodiment is configured to present information regarding a method of determining abnormality of an object to be monitored by an analysis model. Furthermore, the analysis model interpretation apparatus 1 according to the present embodiment is configured to present a method of generating a feature for detecting abnormality in a range not contained in original data of a target analysis model by comparing the target analysis model, which is received from a user, and a previously generated analysis model.

Referring to FIG. 1, the analysis model interpretation apparatus 1 includes a memory 2, a storage 3, a memory port 4, a processor 5, a network I/F (Interface) 6, a WAN (Wide Area Network) 8, and a user I/F 9. A USB (Universal Serial Bus) memory 7 is to be attached to or detached from the memory port 4 as needed. The WAN 8 is merely exemplary and a LAN (Local Area Network) or any other network may be used instead. The storage 3 stores a program and/or a variety of data. The data herein includes model data indicating the analysis model and data of parameters and settings used for a process of interpreting the analysis model. The user I/F 9, which may include a keyboard, a mouse, and a display, receives input from a user and presents output to the user.

The memory 2 stores an analysis model interpretation program 10 that includes a feature interpretation program 11 and a feature generation method selection program 12. The processor 5 executes these programs in response to input from the user I/F 9 and outputs information based on a processing result to the user I/F 9.

The feature interpretation program 11 classifies a feature of an analysis model (target analysis model) received from the user according to a plurality of predetermined abnormality determination features. The abnormality determination features herein are indexes for determining whether the object to be monitored is abnormal by the analysis model. The abnormality determination features are defined in such a manner as to make the user easily understand the features regarding the determination of abnormality by the analysis model.

The feature generation method selection program 12 compares an abnormality determination range of the analysis model (target analysis model) received from the user with an abnormality determination range of the previously generated analysis model (reference analysis model) and selects a method of generating a feature for determining whether the object to be monitored is abnormal in a range for which data has not been collected as the data used for the target analysis model. The abnormality determination range herein refers to a range on a multidimensional space with the abnormality determination features each being defined as an axis, where the analysis model determines that a product is defective.

It should be noted that the feature interpretation program 11 and the feature generation method selection program 12 may be integrally configured or separately configured. Moreover, the feature interpretation program 11 and/or the feature generation method selection program 12 may be implemented by a plurality of software programs.

Figure 2:
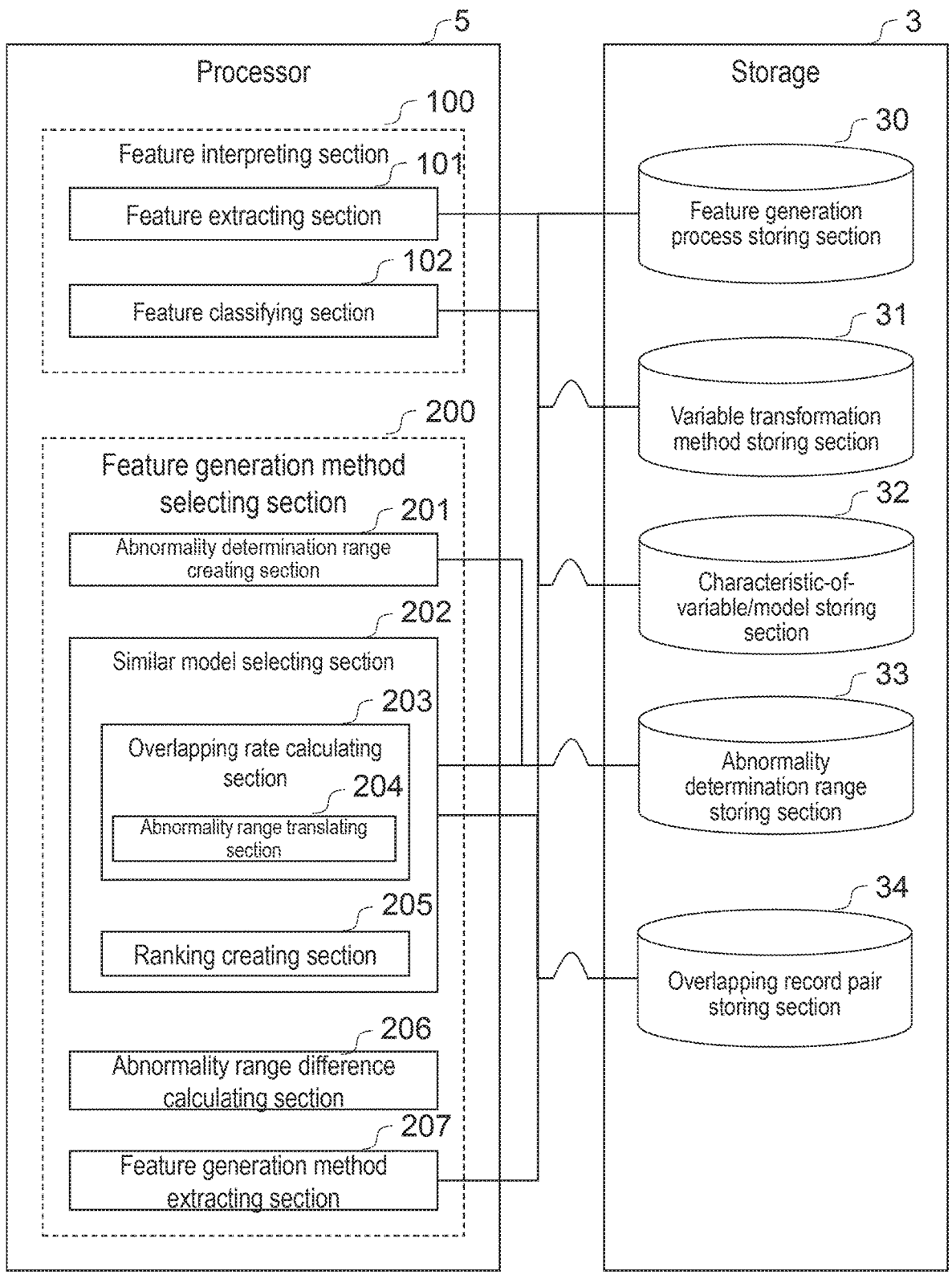
FIG. 2 is a schematic block diagram of the model interpretation apparatus according to the present embodiment.

FIG. 2 is a schematic block diagram of the model interpretation apparatus according to the present embodiment. When the processor 5 executes the feature interpretation program 11, a feature interpreting section 100 is implemented. Furthermore, when the processor 5 executes the feature generation method selection program 12, a feature generation method selecting section 200 is implemented. The feature interpreting section 100 includes a feature extracting section 101 and a feature classifying section 102. The feature generation method selecting section 200 includes an abnormality determination range creating section 201, a similar model selecting section 202, an abnormality range difference calculating section 206, and a feature generation method extracting section 207. The similar model selecting section 202 includes an overlapping rate calculating section 203 and a ranking creating section 205 and the overlapping rate calculating section 203 includes an abnormality range translating section 204.

The feature extracting section 101 extracts a variable representing the feature of the analysis model received from the user with use of a program for creating the analysis model. The feature classifying section 102 classifies the variable extracted by the feature extracting section 101 into one of the abnormality determination features corresponding to the variable.

The abnormality determination range creating section 201 receives the analysis model, or the target analysis model, and sample data acquired from each of non-defective product and defective product, identifies an abnormality determination range for the analysis model by applying the sample data to the analysis model, and registers the abnormality determination range in an abnormality determination range storing section 33.

The similar model selecting section 202 selects an analysis model (similar analysis model) similar to the target analysis model from among analysis models (reference analysis models) previously registered in the abnormality determination range storing section 33.

The abnormality range difference calculating section 206 calculates a difference between an abnormality determination range of the target analysis model and an abnormality determination range of the similar analysis model.

The feature generation method extracting section 207 searches a feature generation process storing section 30 with the difference between the abnormality determination ranges calculated by the abnormality range difference calculating section 206, thereby acquiring a method of generating a feature of a range for which data has not been collected.

The overlapping rate calculating section 203 calculates an overlapping rate between the respective abnormality determination ranges of the target analysis model and the reference analysis model. The ranking creating section 205 sorts the reference analysis models in a descending order of overlapping rates calculated by the overlapping rate calculating section 203. For example, the reference analysis model with an overlapping rate equal to or more than a predetermined threshold is defined as the similar analysis model.

The abnormality range translating section 204 axially translates the target analysis model with a start point of the abnormality determination range of the target analysis model being placed on a start point of the reference analysis model.

The feature generation process storing section 30 stores feature generation process data indicating a process of generating a feature for abnormality determination.

A variable transformation method storing section 31 stores variable transformation method data indicating respective variable names before and after transformation of a variable in a program for creating the analysis model and a function for transforming the variable.

A variable/model characteristic storing section 32 stores data indicating the abnormality determination feature of each of the variable and the analysis model.

The abnormality determination range storing section 33 stores abnormality determination range data indicating the abnormality determination range of the analysis model.

An overlapping record pair storing section 34 stores overlapping record pair data indicating a pair of analysis models whose abnormality determination ranges overlap.

Figure 3:
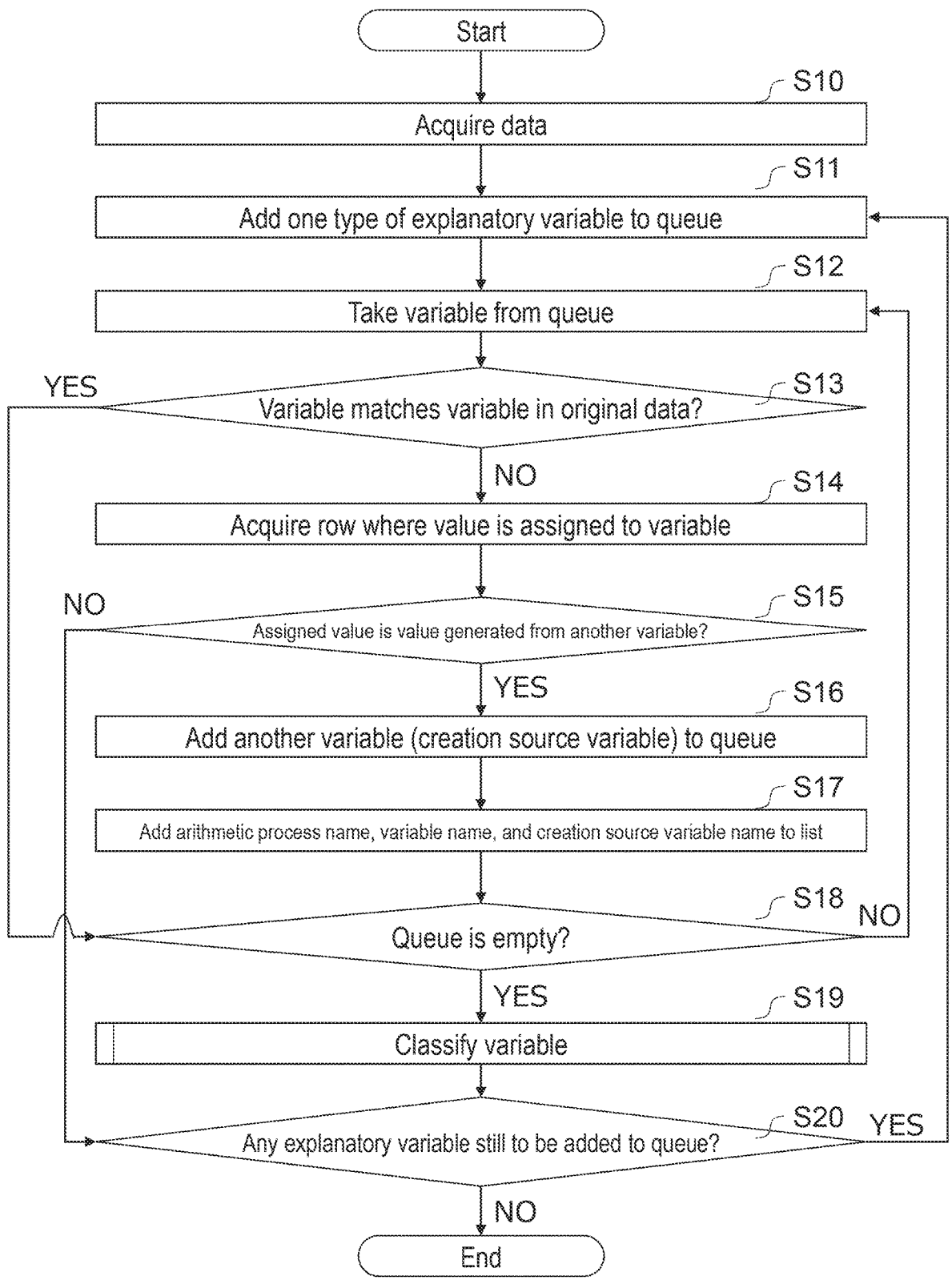
FIG. 3 is a flowchart showing a process of classifying an analysis model according to an abnormality determination feature according to the present embodiment.

FIG. 3 is a flowchart showing a process of classifying an analysis model according to an abnormality determination feature according to the present embodiment.

The feature extracting section 101 receives from a user an analysis model, an explanatory variable name of the analysis model, a variable name of original data of the analysis model, and a program for creating the analysis model and issues a model ID to an analysis model data set containing the above (Step S10). Furthermore, the feature extracting section 101 selects one type of explanatory variable from among the explanatory variable names contained in the data sets and adds it to a backlog queue of explanatory variables to be processed (Step S11). The feature extracting section 101 then takes the explanatory variable from the queue (Step S12). The model ID herein is an identifier for uniquely identifying the analysis model.

Next, the feature extracting section 101 determines whether the variable name of the taken explanatory variable matches the variable name of the variable in the original data (Step S13). If these variable names do not match, the feature extracting section 101 acquires a row where a value is assigned to the explanatory variable with the variable name in the program for generating the analysis model (Step S14).

Next, the feature extracting section 101 determines whether the value assigned to the explanatory variable in the row is a value generated from another variable (Step S15). If the value assigned to the explanatory variable is the value generated from the other variable, the feature extracting section 101 adds a variable (creation source variable) used for generating the explanatory variable where the value is assigned in the row to the backlog queue of variables to be processed (Step S16). The creation source variable refers to a variable where an arithmetic process is applied for creation of the value being assigned to the explanatory variable. After performing Step S16, the feature extracting section 101 adds an arithmetic process name of the arithmetic process (function) in the row, a variable name of the explanatory variable where the value is assigned in the row, and a variable name of the creation source variable for the explanatory variable to the end of a list of features (variables) of target analysis models (Step S17).

Next, the feature extracting section 101 determines whether the queue is empty (Step S18). If the queue is empty, the feature extracting section 101 performs an explanatory variable classifying process of classifying the variable (Step S19). The explanatory variable classifying process will be described later in detail with reference to FIG. 4. If the queue is not empty, the feature extracting section 101 returns to Step S12.

After performing Step S19, the feature extracting section 101 determines whether there is any variable still to be added to the queue (Step S20). If there is a variable still to be added to the queue, the feature extracting section 101 returns to Step S11. If there is no variable still to be added to the queue, the feature extracting section 101 outputs the list of features to the feature classifying section 102 and terminates the process.

If the variable name of the explanatory variable matches the variable name of the variable in the original data in Step S13, the feature extracting section 101 proceeds to Step S18. Moreover, if the value assigned to the explanatory variable is not the value generated from another variable in Step S15, the feature extracting section 101 proceeds to Step S20.

A specific example of a process of classifying an analysis model according to the abnormality determination features is given below. In this example, the analysis model is represented by y=w1*x1+w2*x2. FIG. 16 shows a program for creating the analysis model. In the program 400, original data 401 refers to original data used for establishing the analysis model. In other words, row_data refers to a variable of the original data of the analysis model. A feature 402 refers to a feature, i.e., the variable of the analysis model. In other words, the x1 and x2 each denotes the explanatory variable of the analysis model.

First, the feature extracting section 101 adds the variable x1 to the queue in Step S11. Next, the feature extracting section 101 takes the variable from the queue in Step S12. At this time, the queue has only the variable x1, which is taken.

Next, since the taken variable x1 does not match the variable row_data of the original data shown in FIG. 16 in Step S13, the feature extracting section 101 proceeds to Step S14.

In Step S14, the feature extracting section 101 acquires a row where a value is assigned to the variable x1 from the program shown in FIG. 16. Specifically, the feature extracting section 101 acquires x1, x2=select_freq(train_data) in the fourth row in the program. Next, the feature extracting section 101 proceeds to Step S16 as the value assigned to the variable x1 in the row is determined to be a value generated from another in variable train_data in Step S15. In Step S16, the feature extracting section 101 adds the other variable train_data to the queue.

Subsequently, in Step S17, the feature extracting section 101 adds an arithmetic process name of select_freq, a variable name of x1 and a creation source variable name of train_data to the end of the list. Since the queue is determined not to be empty in Step S18, the feature extracting section 101 proceeds to Step S12. The feature extracting section 101 now takes the variable name of train_data from the queue in Step S12.

Next, the feature extracting section 101 repeats the process from Step S11 to Step S18 again. As a result, the arithmetic process name of train_test_split, the variable name of train_data, and the creation source variable name of freq_data, which are in the third row in the program, are added to the end of the list.

Moreover, returning to Step S11, the feature extracting section 101 repeats the process from Step S11 to Step S18 again. As a result, the arithmetic process name of FFT, the variable name of freq_data, and the creation source variable name of row_data, which are in the second row in the program, are added to the end of the list.

Subsequently, the feature extracting section 101 again proceeds to Step S11. Since the variable taken from the queue in Step S12 has the variable name of row_data, the variable name of the variable, i.e., row_data, matches the variable name of the variable, i.e., row_data, in the original data in Step S13. The feature extracting section 101 thus proceeds to Step S18. Since the queue is now determined to be empty in Step S18, the feature extracting section 101 proceeds to Step S19.

In Step S19, the feature extracting section 101 classifies the variable x1 through the explanatory variable classifying process. In this example, the variable x1 is classified into "Frequency (Constant)" representing a constant frequency, which is an abnormality determination feature.

Subsequently, in Step S20, the feature extracting section 101 checks whether there is any variable still to be added to the queue. In this example, the variable x2 has not been added to the queue. Thus, returning to Step S11, the feature extracting section 101 adds the variable x2 to the queue in Step S11.

The feature extracting section 101 then performs on the variable x2 a process similar to the above process on the variable x1. In this example, the variable x2 is thus classified into "Frequency (Constant)" in Step S19. Then, since determining that there is no variable still to be added to the queue in Step S20, the feature extracting section 101 terminates the series of process.

Figure 4:
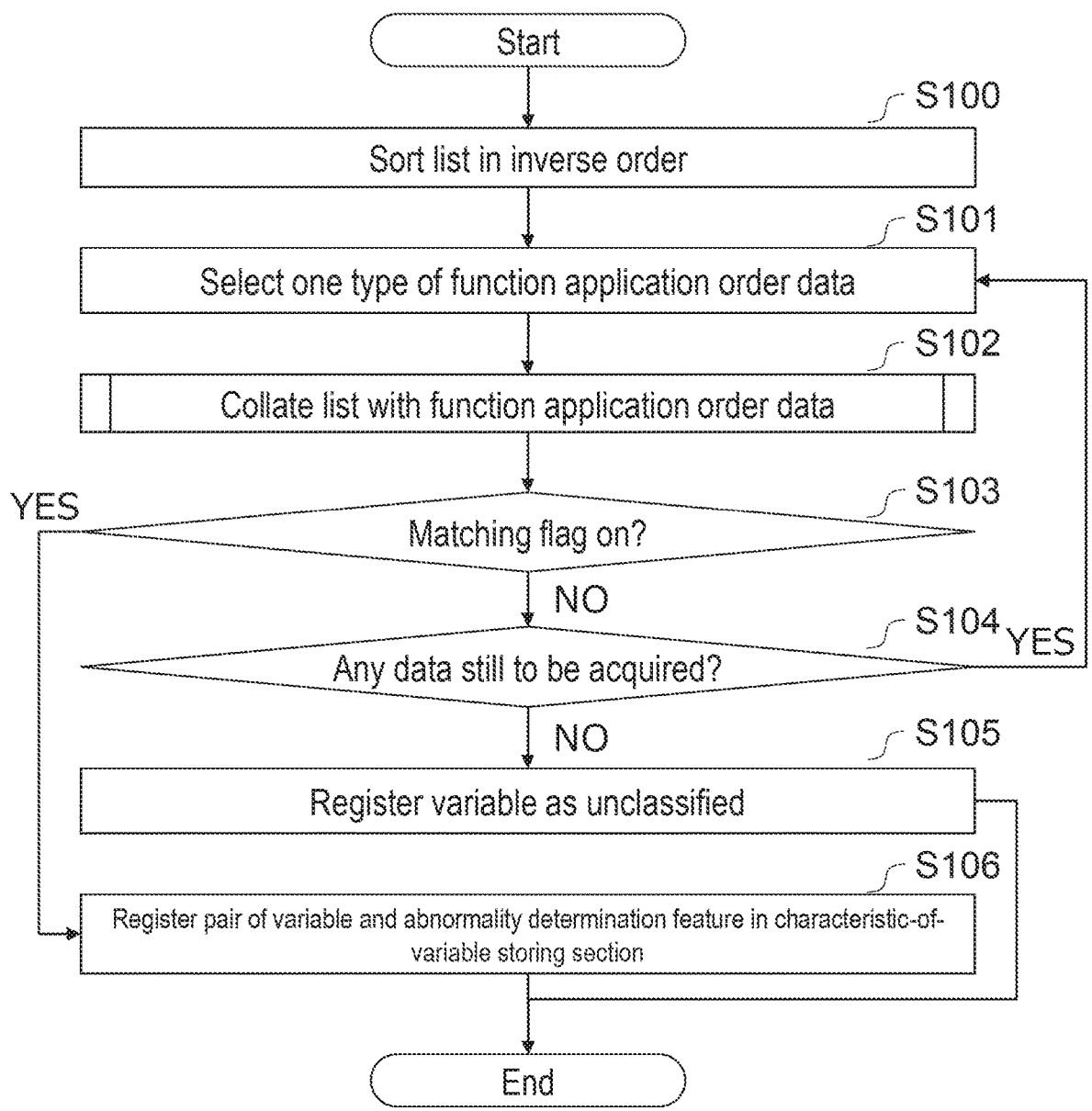
FIG. 4 is a detailed flowchart of a process of classifying an explanatory variable shown in Step S19 in FIG. 3.

FIG. 4 is a detailed flowchart of a process of classifying the explanatory variable shown in Step S19 in FIG. 3. Receiving the list from the feature extracting section 101, the feature classifying section 102 resorts the data accumulated in the list in the inverse order and registers it in the variable transformation method storing section 31 (Step S100). Subsequently, the feature classifying section 102 selects from the feature generation process storing section 30, which stores a basic application order of functions (hereinafter, this application order of functions being referred to as "basic form") for each of the abnormality determination features as a record per abnormality determination feature, the record for one of the abnormality determination features (Step S101), and collates the list registered in the variable transformation method storing section 31 with the basic form in the selected record, thereby determining whether the list registered in the variable transformation method storing section 31 matches the order of functions according to the basic form (function application order data) (Step S102).

The basic form in the record of the function application order is provided as a list of functions for generating the corresponding abnormality determination feature. The list has records of functions, where arithmetic process names of the functions are sorted in the application order according to the basic form and recorded. The basic form is hereinafter also referred to as function application order data.

It should be noted that matching between the list registered in the variable transformation method storing section 31 and the order of functions according to the basic form (function application order data) herein means that all the contained functions ordered in accordance with the basic form appear in this order in the list registered in the variable transformation method storing section 31. The order of functions may be determined to match even when the list registered in the variable transformation method storing section 31 contains a function that is not contained in the basic form. The process of collating the list registered in the variable transformation method storing section 31 and the list of the basic form in the selected record in Step S102 will be described later in detail with reference to FIG. 5.

If a matching flag is on, that is, the order of functions in the list registered in the variable transformation method storing section 31 is determined to match the order of functions indicated by the function application order data as a result of performing Step S102 (Step S103: YES), the feature classifying section 102 registers the model ID of the corresponding analysis model, the variable in the list recorded in the variable transformation method storing section 31, and an abnormality determination feature ID that identifies the abnormality determination feature corresponding to this variable in the variable/model characteristic storing section 32 (Step S106) and terminates the process.

Meanwhile, if the matching flag is not on in Step S103, the feature classifying section 102 checks whether there is any record of function application order data still to be selected in the process of Step S101 (Step S104). If there is a record of function application order data still to be selected, the feature classifying section 102 returns to Step S101, selecting the next record. If there is no record of function application order data still to be selected, the feature classifying section 102 registers the variable in the list recorded in the variable transformation method storing section 31 as a variable (unclassified data) that is classified into none of the abnormality determination features in the variable/model characteristic storing section 32 (Step S105) and terminates the process.

A specific example of the process of classifying the explanatory variable is given below.

In Step S100, the feature classifying section 102 receives the list from the feature extracting section 101. In this example, the above list is a list with row each including three elements and the three elements are arithmetic process name, variable name, creation source variable name in an order from the beginning (left). It is assumed that the received list of target analysis model features contains ((select_freq, x1, train_data), (train_test_split, train_data, freq_data), and (FFT, freq_data, row_data)). For example, (select_freq, x1, train_data) means that the arithmetic process name of the function is select_freq, the variable name of the explanatory variable where a value is assigned is x1, and the variable name of the creation source variable for the explanatory variable is train_data. The feature classifying section 102 then sorts the features amounts in the received list in the inverse order and registers it in the variable transformation method storing section 31. The registered list contains ((FFT, freq_data, row_data), (train_test_split, train_data, freq_data), and (select_freq, x1, train_data)).

An example of the list registered in the variable transformation method storing section 31 is shown in FIG. 11. In the variable transformation method storing section 31, a plurality of entries each including an ID 310, an arithmetic process name 311, a variable name 312, and a creation source variable name 313 are registered. The ID 310 refers to an identification number for uniquely identifying each of the entries. The arithmetic process name 311 refers to a name of a function used for generating a value stored under the variable name 312. The variable name 312 refers to a name of a variable for storing an output result of passing a value stored under the creation source variable name 313 to the function whose name is stored under the arithmetic process name 311. The creation source variable name 313 refers to the name of the variable passed to the function whose name is stored under the arithmetic process name 311. For example, a value of a variable with a variable name of "row_data" is passed to a function with a function name of FFT and an output of the function is stored as a variable with a name of "freq_data". In this case, an entry such as the entry where "1" is entered under the ID 310 in FIG. 11 is registered in the variable transformation method storing section 31, where "FFT" is entered under the arithmetic process name 311, "freq_data" is entered under the variable name 312, and "row_data" is entered under the creation source variable name 313.

The feature classifying section 102 then selects one type of record from the feature generation process storing section 30 in Step S101. FIG. 10 shows the data indicating the feature generation process of the abnormality determination features stored in the feature generation process storing section 30. Referring to FIG. 10, a plurality of entries each including an ID 300, an abnormality determination feature 301, and a basic form 302 are registered in the feature generation process storing section 30. The ID 300 refers to an identification number for uniquely identifying each of the entries. The abnormality determination feature 301 refers to a name of each of the abnormality determination features. The basic form 302 refers to a list of function names where the names of functions in a function group to be applied to generate the corresponding abnormality determination feature are arranged in an order of application of the functions.

For example, a feature for determining abnormality when the frequency is constantly high is generated by applying FFT (Fast Fourier Transform) to vibration data. In this case, an entry where "Frequency (Constant)" meaning that abnormality is determined when the frequency is constantly high is entered under the abnormality determination feature 301 and "FFT" is entered under the basic form 302 is registered in the feature generation process storing section 30. FIG. 10 shows, as an entry with "1" under the ID 300, an entry where "Frequency (Constant)" is entered under the abnormality determination feature 301 and "FFT" is entered under the basic form 302.

Subsequently, in Steps S102 and S103, the feature classifying section 102 compares a field of the arithmetic process name 311 in the list registered in the variable transformation method storing section 31 and a field of the basic form 302 in the record selected from the feature generation process storing section 30 to determine whether the orders of application of functions match each other.

Figure 12:
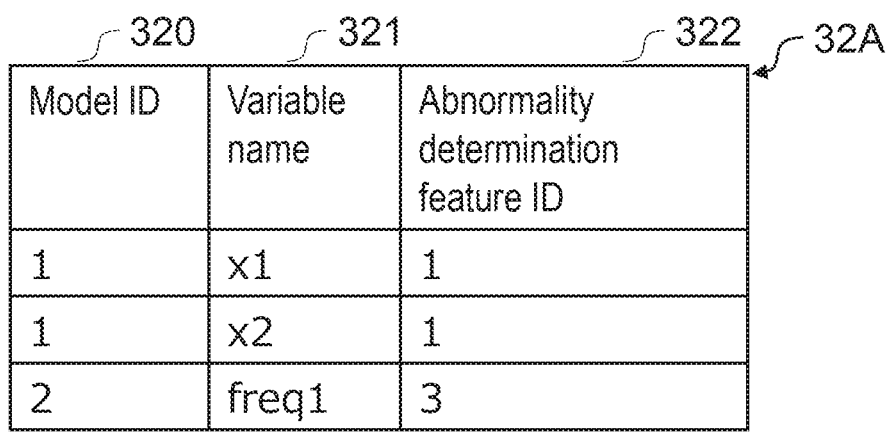
FIG. 12 is a diagram showing data for variable classification registered in a variable characteristic storing section 32A.

In this example, since only FFT is entered in the field of the basic form 302 while FFT is contained in the field of the arithmetic process name 311, the orders of application of functions are determined to match each other. Thus, the feature classifying section 102 registers a model ID of "1" for the target analysis model, a variable of x1, and an abnormality determination feature ID of "1" for the abnormality determination feature corresponding to the variable in a variable characteristic storing section 32A of the variable/model characteristic storing section 32. FIG. 12 shows data for variable classification registered in the variable characteristic storing section 32A. Referring to FIG. 12, a plurality of entries each including a model ID 320, a variable name 321, and an abnormality determination feature ID 322 are registered in the variable characteristic storing section 32A.

The model ID 320 refers to an identifier for uniquely identifying each of the analysis models. The variable name 321 refers to a name of the feature, i.e., variable, of the analysis model. The abnormality determination feature ID 322 refers to an identifier for identifying the abnormality determination feature corresponding to the variable whose name is entered under the variable name 321. Stored under the abnormality determination feature ID 322 are the same values as those under the ID 300 registered in the feature generation process storing section 30 as exemplified in FIG. 10. For example, regarding the analysis model with a model ID of 1, abnormality is to be determined when the feature is a variable x1 and the frequency of the variable x1 is constantly high. In this case, an entry where "1" is entered under the model ID 320, "x1" is entered under the variable name 321, and "1" is entered under the abnormality determination feature ID 322 is registered in the variable characteristic storing section 32A as shown in FIG. 12. In this example, the abnormality determination feature of determining abnormality when the frequency is constantly high has the abnormality determination feature ID of 1. In the first row shown in FIG. 12, a model ID of "1", the variable x1, and an abnormality determination feature ID of "1" are shown.

Figure 5:
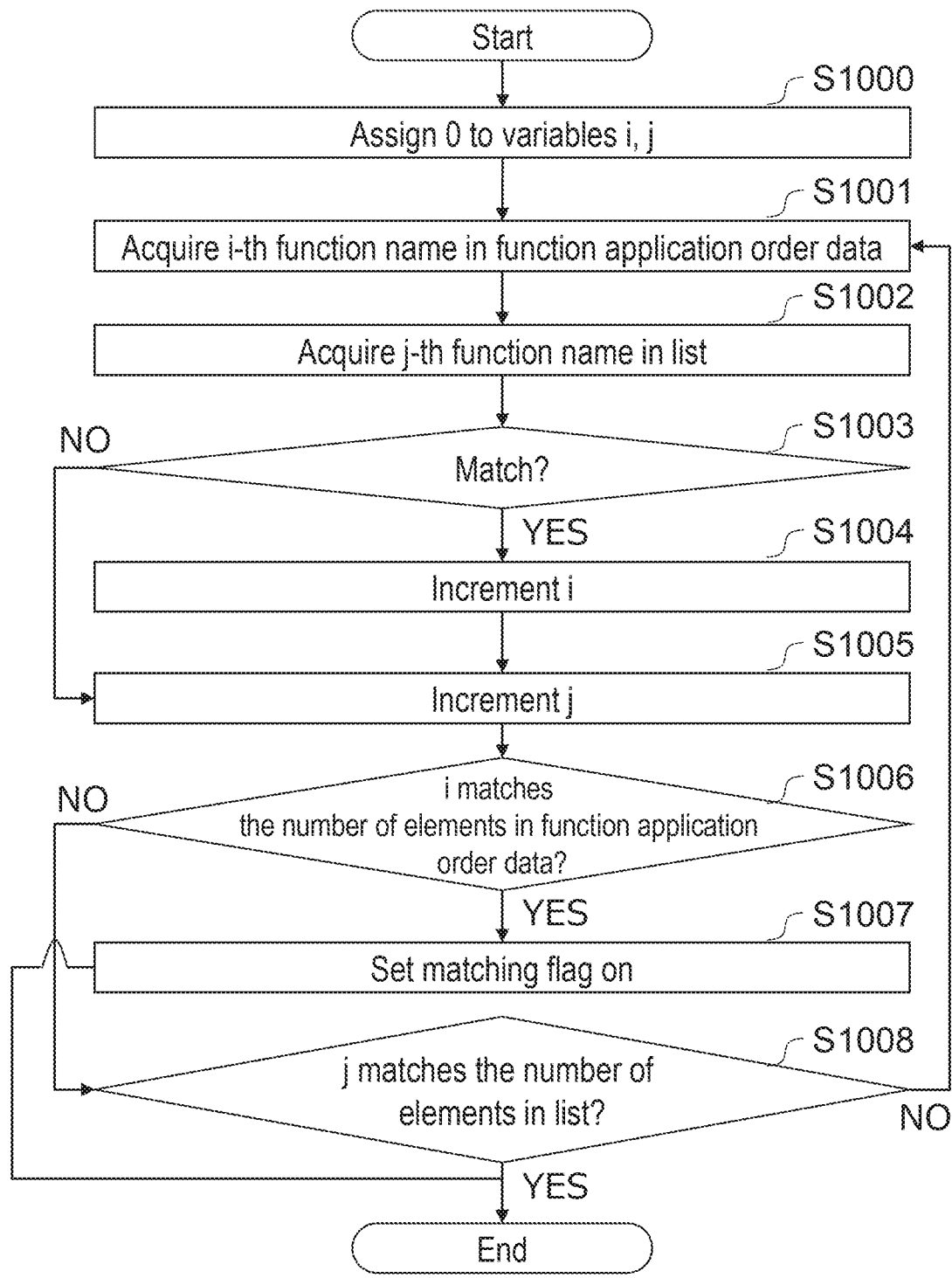
FIG. 5 is a detailed flowchart of a process of collating a list and function application order data shown in Step S102 in FIG. 4.

FIG. 5 is a detailed flowchart of a process of collating a list and function application order data shown in Step S102 in FIG. 4. For the process of FIG. 5, variables i, j for storing counter values are defined. First, the feature classifying section 102 assigns 0 to each of the variables i, j (Step S1000).

Next, the feature classifying section 102 acquires an i-the function name from any row in the function application order data (Step S1001) and acquires a j-th function name (function name in a j-th row) from the list registered in the variable transformation method storing section 31 (Step S1002). The function application order data acquired here corresponds to the data of the record selected in Step S101. Meanwhile, the functions names acquired here corresponds to the list with the functions being inversely sorted in Step S100.

If the i-th function name in the function application order data matches the j-th function name in the list (Step S1003: YES), the feature classifying section 102 increments the variable i (Step S1004). Subsequently, the feature classifying section 102 increments the variable j (Step S1005).

Next, the feature classifying section 102 determines whether the variable i matches the number of elements (the number of functions) in the function application order data (Step S1006). If the variable i matches the number of elements in the function application order data, the feature classifying section 102 sets a matching flag on (Step S1007) and terminates the process.

In Step S1006, if the variable i does not match the number of elements (the number of functions) in the function application order data, the feature classifying section 102 checks whether the variable j matches the number of elements (the number of functions) in the list registered in the variable transformation method storing section 31 (Step S1008).

If the variable j matches the number of elements (the number of functions) in the list registered in the variable transformation method storing section 31 (Step S1008: YES), the feature classifying section 102 terminates the process. If the variable j does not match the number of elements (the number of functions) in the list registered in the variable transformation method storing section 31 (Step S1008: NO), the feature classifying section 102 returns to Step S1001.

A specific example of the process of collating the list and the function application order data is given below.

In the example given here, the list shown in FIG. 11 is collated with the function application order data of the abnormality determination feature referred to as "Frequency (Constant)" shown in the first row (ID 300=1) in FIG. 10.

Referring to FIG. 10, the list of the functions of the basic form of the function application order data is (FFT). Referring to FIG. 11, the list showing the order of application of the functions to the feature is (FFT, train_test_split, select_freq).

In Step S1001, the feature classifying section 102 acquires the function name FFT of a 0-th function from the function application order data of FIG. 10 in accordance with the variable i=0. Furthermore, in Step S1002, the feature classifying section 102 acquires the function name FFT of a 0-th function from the list of FIG. 11 in accordance with the variable j=0.

Then, in Step S1003, the feature classifying section 102 determines whether the function name acquired in Step S1001 and the function name acquired in Step S1002 match each other. In this example, since the function names match, the feature classifying section 102 increments the variable i to achieve i=1 in Step S1004 and increments the variable j to achieve j=1 in Step S1005.

Subsequently, in Step S1006, the feature classifying section 102 compares the variable i and the number of elements in the function application order data. In this example, since the function application order data of FIG. 10 has merely a single element, i.e., FFT, the number of functions is 1. Thus, the variable i matches the number of elements in the function application order data. Proceeding to Step S1007, the feature classifying section 102 sets a matching flag corresponding to the function application order data on and terminates the process.

Figure 6:
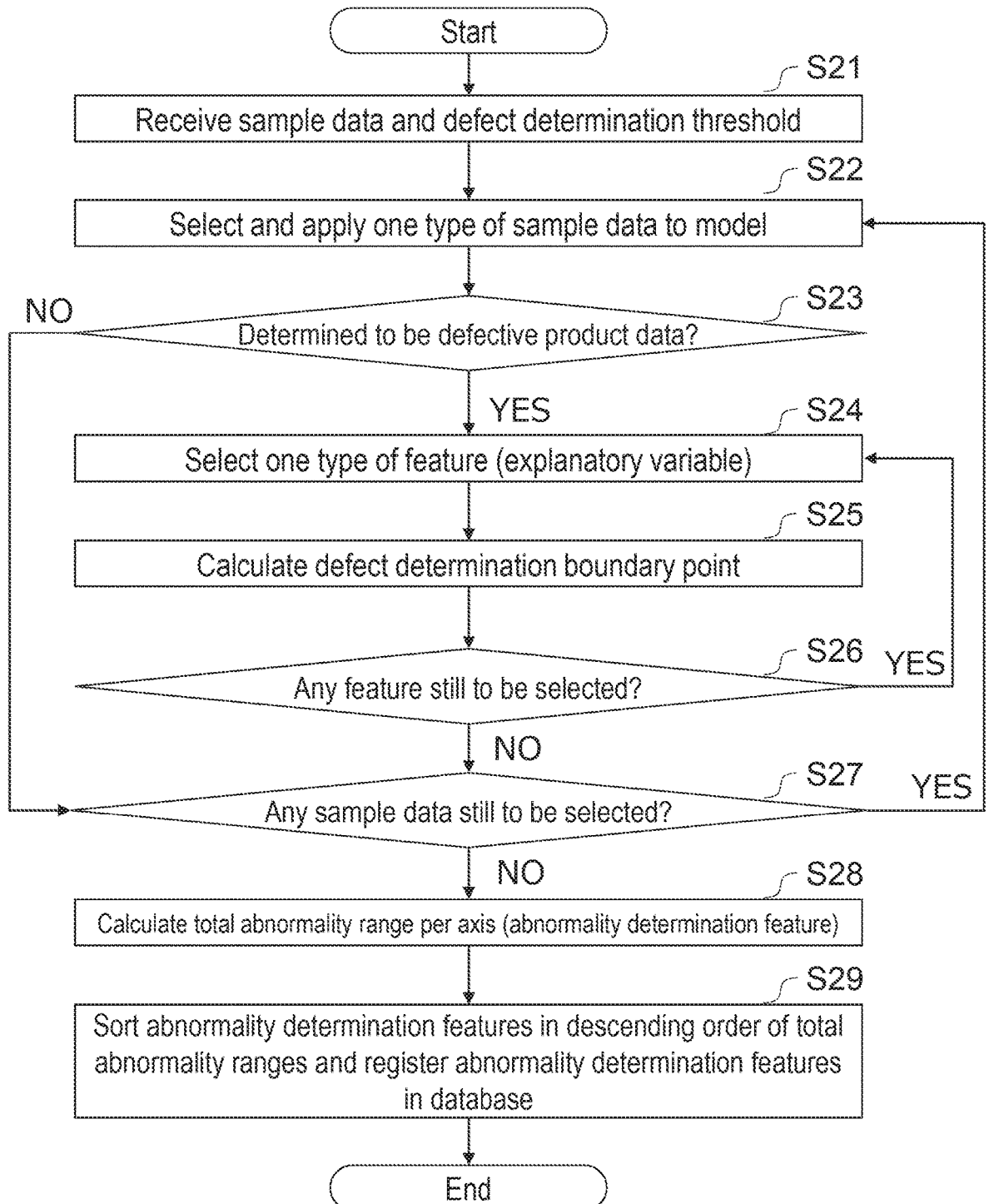
FIG. 6 is a flowchart of a process of creating data of an abnormality determination range according to the present embodiment.

FIG. 6 is a flowchart of a process of creating the data of the abnormality determination range according to the present embodiment.

The abnormality determination range creating section 201 receives from a user a target analysis model, sample data acquired from each of non-defective product and defective product, and a defect determination threshold (Step S21). The defect determination threshold is a threshold for determining whether an object to be monitored is non-defective or defective in accordance with a value of a variable in the data.

Figure 17:
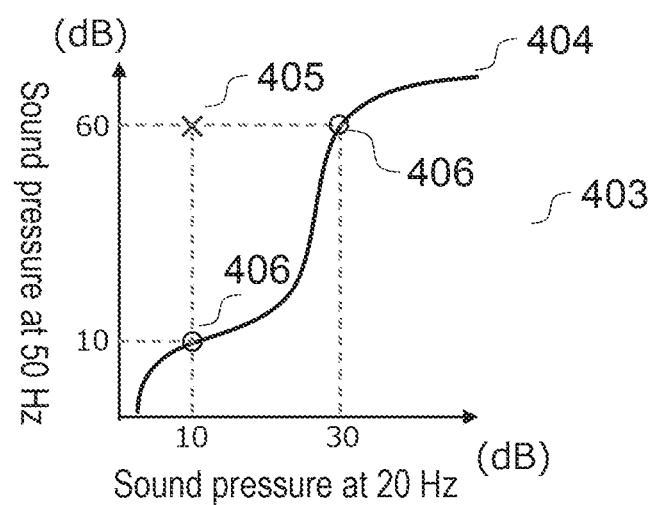
FIG. 17 is a diagram for explaining an example of a method of identifying the abnormality determination range.

FIG. 17 is a diagram for explaining an example of a method of identifying the abnormality determination range. In a case of a plurality of variables, the defect determination threshold may be shown in the form of a line or plane that divides a space where axes represent the variables into a range corresponding to a non-defective product and a range corresponding to a defective product as shown in FIG. 17. In FIG. 17, the variable corresponding to an ordinate axis is a sound pressure at 50 Hz and the variable corresponding to an abscissas axis is a sound pressure at 20 Hz. The defect determination threshold 404 corresponds to a boundary line for the analysis model to determine whether the sample data is data of a non-defective product or data of a defective product. Defective product data 405 is data of vibration collected from the defective product. A defect determination boundary point 406, which lies above the defect determination threshold 404, is a boundary point for determining whether sample data is defect data.

The abnormality determination range creating section 201 selects one type of sample data and applies the sample data to the target analysis model (Step S22). The abnormality determination range creating section 201 then determines whether the sample data is determined to be the data of the non-defective product or the data of the defective product by the target analysis model (Step S23). If the sample data is determined to be the data of the defective product by the target analysis model (Step S23: YES), the abnormality determination range creating section 201 selects one of the features (Step S24), calculates a defect determination boundary point, and registers a record in the abnormality determination range storing section 33 (Step S25).

In this example, the defect determination boundary point refers to a boundary point for the target analysis model to determine whether the sample data corresponds to the defective product. The defect determination boundary point is defined such that the sample data is determined to correspond to the defective product. In the example of FIG. 17, the sample data corresponds to the defective product data 405. The defect determination boundary point 406 refers to a point being on the defect determination threshold 404 as being translated from the defective product data 405 perpendicularly to each of the axes.

After performing Step S25, the abnormality determination range creating section 201 determines whether there is any feature still to be selected (Step S26). If there is a feature still to be selected, the abnormality determination range creating section 201 returns to Step S24. If there is no feature still to be selected, the abnormality determination range creating section 201 determines whether there is any sample data still to be selected (Step S27). If there is sample data still to be selected, the abnormality determination range creating section 201 returns to Step S22. If there is no sample data still to be selected, the abnormality determination range creating section 201 calculates a total abnormality determination range per abnormality determination feature (axis in FIG. 17) (Step S28). The total abnormality determination range is a value of a sum of a difference between respective values of the defective product data 405 and the defect determination boundary point 406 on one of the axes and a difference between respective values thereof on the other axis. In the example of FIG. 17, the total abnormality determination range is 70 dB, which is a sum of (30−10) dB on the abscissa axis and (60−10) dB on the ordinate axis.

The abnormality determination range creating section 201 then sorts the abnormality determination features in a descending order of the values of the total abnormality determination range and registers the abnormality determination features in the model characteristic storing section 32B (Step S29), and terminates the process.

In Step S23, if determining that the sample data is not defective product data, the abnormality determination range creating section 201 proceeds to Step S27.

A specific example of the process of creating the abnormality determination range is given below.

In this example, the target analysis model has a model ID of 3 and the target analysis model is represented by y=w1*x1+w2*x2. The sample data, which corresponds to the defective product data 405 shown in FIG. 17, is ((10, 60), (40, 40)). For example, (10, 60) means that a sound pressure at 20 Hz is 10 dB and a sound pressure at 50 Hz is 60 dB. A criterion for determining whether the data corresponds to the non-defective product or the defective product in FIG. 17 is in the form of a curve representing the defect determination threshold 404. In FIG. 17, any data on or above the defect determination threshold 404 is determined to be defective product data. In this example, the target analysis model y has the variable x1 regarding a sound pressure at 20 Hz, the variable x2 regarding a sound pressure at 50 Hz, the coefficient w1 representing a weight added to the variable x1, and the coefficient w2 representing a weight added to the variable x2. The sample data is in the form of a list of data acquired from a plurality of products and elements in the sample data each correspond to a feature of vibration data collected from one of the products. The elements include a feature regarding a sound pressure at 20 Hz and a sound pressure at 50 Hz.

In Step S22 of the flowchart of FIG. 6, the abnormality determination range creating section 201 takes sample data 405, i.e., (10, 60), from among pieces of sample data and assigns the sample data 405 to the target analysis model y. As shown in FIG. 17, the sample data 405 lies above the defect determination threshold 404, so that the sample data 405 is determined to be defective product data.

Proceeding to Step S24, the abnormality determination range creating section 201 selects the variable x1 in Step S24. Subsequently, the abnormality determination range creating section 201 calculates the defect determination boundary point 406 as shown in FIG. 17 in Step S25. Furthermore, since the variable x2 has not been selected in Step S26, the abnormality determination range creating section 201 returns to Step S24. The abnormality determination range creating section 201 then performs the process of Step S25, calculating a defect determination boundary point for the variable x2. Now that there is no sample data still to be selected in Step S26, the abnormality determination range creating section 201 proceeds to Step S27. In Step S27, since sample data (40, 40) has not been selected, the abnormality determination range creating section 201 returns to Step S22, providing the sample data (40, 40) to the target analysis model y.

Since lying below the defect determination threshold 404 shown in FIG. 17, the sample data (40, 40) is determined not to be defective product data in Step S23. Accordingly, the abnormality determination range creating section 201 proceeds to Step S27. In Step S27, now that there is no sample data still to be selected, the abnormality determination range creating section 201 proceeds to Step S28. In Step S28, the abnormality determination range creating section 201 calculates the total abnormality range per abnormality determination feature.

In this example, the variable referred to as the "sound pressure at 20 Hz" and the variable referred to as the "sound pressure at 50 Hz" each correspond to the abnormality determination feature referred to as "Frequency (Constant)." The respective abnormality determination ranges for the variables are 30−10=20 and 60−10=50 as shown in FIG. 17. Thus, the total abnormality range of the abnormality determination feature "Frequency (Constant)" is 20+50=70 [dB]. In this example, since there is no abnormality determination feature but Frequency (Constant)", the result of sorting in Step S29 provides "Frequency (Constant)" only.

Figure 13:
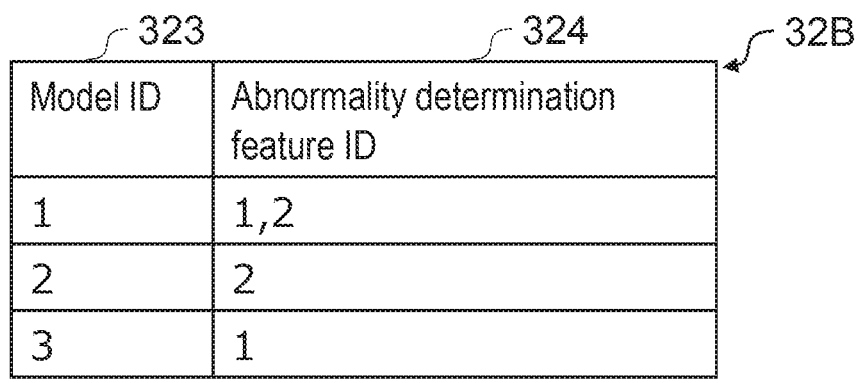
FIG. 13 is a diagram showing an example of data registered in a model characteristic storing section 32B.

FIG. 13 shows an example of the data registered in the model characteristic storing section 32B. Referring to FIG. 13, a plurality of entries each including a model ID 323 and an abnormality determination feature ID 324 are registered in the model characteristic storing section 32B. The model ID 323 is an identification number for uniquely identifying each of the analysis models and the same value as that of the model ID 320 in FIG. 12 is used therefor. The abnormality determination feature ID 324 is an identification number for uniquely identifying each of the abnormality determination features and the same value as that of the abnormality determination feature ID 322 in FIG. 12 is registered. For example, regarding an analysis model with a model ID of 1, an abnormality determination feature of determining abnormality when the frequency is constantly high and an abnormality determination feature of determining abnormality when the amplitude is constantly large are provided. In this case, an entry where "1" is entered under the model ID 323 and "1" and "2" are entered under the abnormality determination feature ID 324 is registered in the model characteristic storing section 32B. In this example, the abnormality determination feature of determining abnormality when the frequency is constantly high has the abnormality determination feature ID of 1 and the abnormality determination feature of determining abnormality when the amplitude is constantly large has the abnormality determination feature ID of 2.

As shown in FIG. 10, since the abnormality determination feature referred to as "Frequency (Constant)" has the abnormality determination feature ID of "1", the abnormality determination range creating section 201 stores an entry with a model ID of "3" and an abnormality determination feature ID of "1" in the model characteristic storing section 32B shown in FIG. 13.

Figure 7:
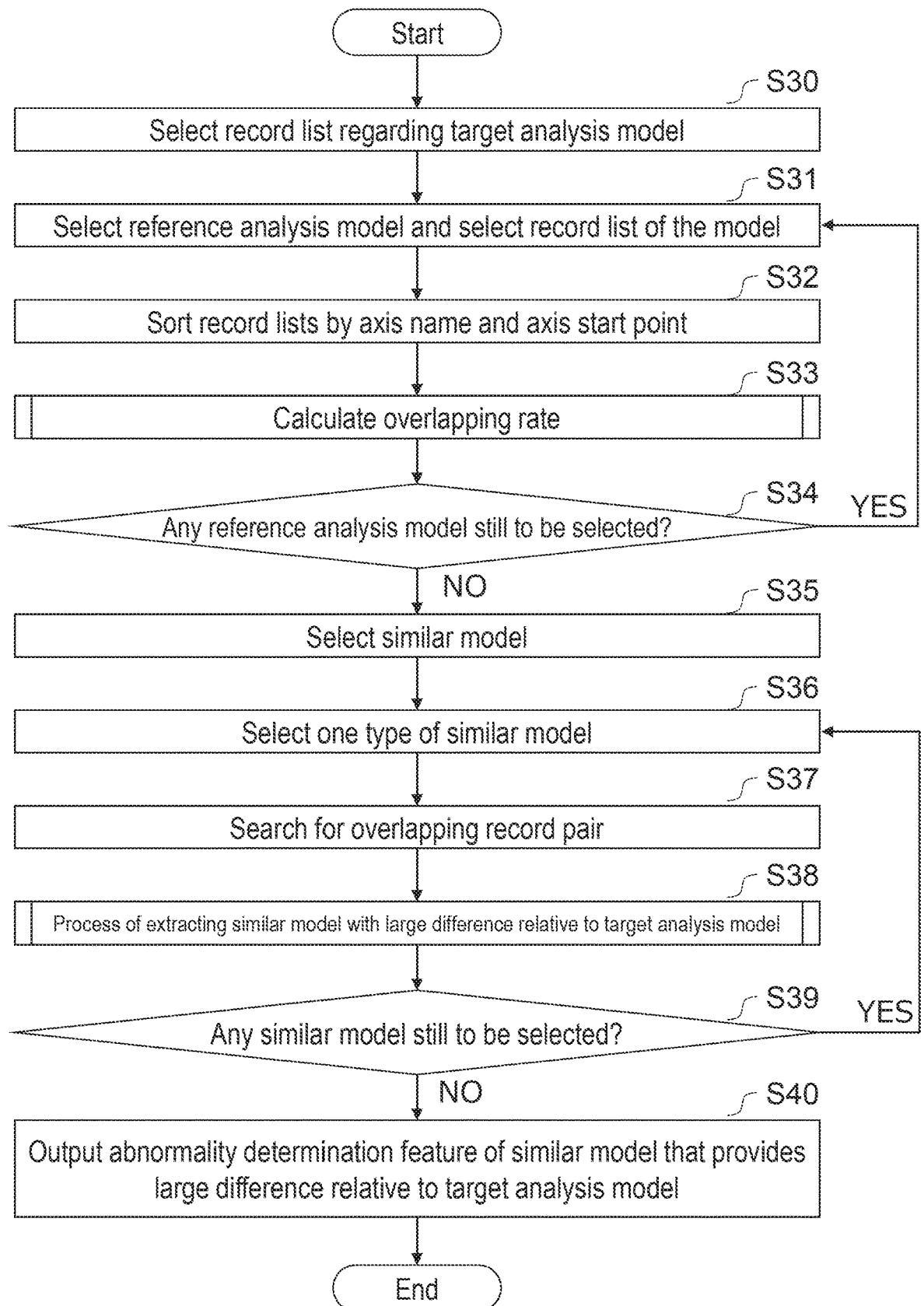
FIG. 7 is a flowchart showing a process of selecting a similar analysis model according to the present embodiment.

FIG. 7 is a flowchart showing a process of selecting a similar analysis model according to the present embodiment.

The similar model selecting section 202 selects a record list of abnormality determination ranges regarding the target analysis model from the abnormality determination range storing section 33 (Step S30). Furthermore, the similar model selecting section 202 selects a record list of abnormality determination ranges regarding the reference analysis model from the abnormality determination range storing section 33 (Step S31). Stored in the record list of abnormality determination ranges is information indicating the abnormality determination range of each of the abnormality determination features (axis). The similar model selecting section 202 resorts the respective record lists for the target analysis model and the reference analysis model in an order based on a plurality of keys including axis name and axis start point (Step S32). This allows for easily comparing the respective abnormality determination ranges for the target analysis model and the reference analysis model. It should be noted that the axis may have fixed start point and/or end point, which are respectively referred to as axis start point and axis end point.

The similar model selecting section 202 provides the two record lists of abnormality determination ranges to the overlapping rate calculating section 20 for calculation of an overlapping rate between the respective abnormality determination ranges (Step S33). A process of calculating the overlapping rate will be described later in detail with reference to FIG. 8.

The similar model selecting section 202 determines whether there is any reference analysis model still to be selected (Step S34). If there is a reference analysis model still to be selected, the similar model selecting section 202 returns to Step S31.

If there is no reference analysis model still to be selected in Step S34, the similar model selecting section 202 extracts, as the similar analysis model, the reference analysis model whose overlapping rate in abnormality determination range relative to the target analysis model is equal to or more than a threshold (Step S35). The similar model selecting section 202 then selects one type of similar analysis model (Step S36) and acquires the record including both the respective model IDs of the target analysis model and the selected similar analysis model from the overlapping record pair storing section 34 (Step S37). In the overlapping record pair storing section 34, the target analysis model and the reference analysis model are paired as an overlapping record pair and an axial difference between each of such overlapping record pairs, which indicates a relative axial adjustment amount, is recorded. In this example, the axial difference is a value given by subtracting the axis start point of the reference analysis model from the axis start point of the target analysis model. In a case where the axis end point of either one of the target analysis model or the reference analysis model is empty, the axial difference is empty.

The similar model selecting section 202 extracts the similar analysis model with a larger difference relative to the target analysis model with use of the acquired overlapping record pairs (Step S38). It is determined whether the difference between the target analysis model and the similar analysis model is large on the basis of a difference area between the target analysis model and the similar analysis model. The difference area between the target analysis model and the similar analysis model is a sum of non-overlapping ranges between the respective abnormality determination ranges of the abnormality determination feature. The process of extracting the similar analysis model with a large difference relative to the target analysis model will be described later in detail with reference to FIG. 9.

Subsequently, the similar model selecting section 202 determines whether there is any similar analysis model still to be selected (Step S39). If there is a similar analysis model still to be selected, the similar model selecting section 202 returns to Step S36, selecting a new similar analysis model and repeating the process. If there is no similar analysis model still to be selected in Step S39, the similar model selecting section 202 outputs the abnormality determination feature of each of the similar analysis models that provides a large difference relative to the target analysis model (Step S40) and terminates the process.

A specific example of the process of selecting the similar analysis model is given below.

FIG. 14 is a diagram showing an example of data stored in the abnormality determination range storing section 33. In the abnormality determination range storing section 33, a plurality of entries each including an ID 330, a model ID 331, an axis name 332, an axis start point 333, an axis end point 334, an abnormality range start point 335, and an abnormality range end point 336 are registered. The ID 330 refers to an identification number for uniquely identifying each of the entries. The model ID 331 refers to an identification number for uniquely identifying each of the analysis models and the same value as that of the model ID 320 in FIG. 12 is used therefor. The axis name 332 refers to an abnormality determination feature ID of each of the abnormality determination features corresponding to an axis and the same value as that of the abnormality determination feature 301 in FIG. 10 is used therefor. In a case where the abnormality determination feature stored under the axis name 332 corresponds to an axis, the axis start point 333 and the axis end point 334 respectively refer to start point and end point of the axis. The abnormality range start point 335 and the abnormality range end point 336 respectively refer to start point and end point of the abnormality determination range within a range defined from a value of the axis start point 333 to a value of the axis end point 334. For example, regarding an analysis model with a model ID of 1, abnormality is determined when the frequency is 10 Hz and the vibration sound is in a range from 10 dB to 30 dB. In this case, an entry where the model ID 331 is "1", the axis name 332 is "Frequency (Constant)", the axis start point 333 is "10 Hz", the abnormality range start point 335 is "10 dB", and the abnormality range end point 336 is "30 Hz" is registered in the abnormality determination range storing section 33. In the example of FIG. 14, the above data is stored in an entry where the ID 330 is "1." In this example, since the axis has no end point, the axis end point 334 is empty (_).

In this example, in Step S30, the similar model selecting section 202 acquires, as a record list of abnormality determination ranges of the target analysis model of a model ID=3, a record of an ID=5 and a record of an ID=6 in FIG. 14. Then, in Step S31, the similar model selecting section 202 selects a reference analysis model of a model ID=1. In the example of FIG. 14, three types of records of IDs=1, 2, and 3 are acquired.

In Step S33 through Step S32, the similar model selecting section 202 calculates an overlapping rate between the respective abnormality determination ranges of the target analysis model and the reference analysis model, which is 83%. In this example, there is no reference analysis model still to be selected in Step S34.

Meanwhile, in this example, a threshold of the overlapping rate for determining whether the reference analysis model is to be a similar analysis model is 60%. Since the overlapping rate is 83%, exceeding the threshold of 60%, the similar model selecting section 202 selects a reference analysis model of a model ID=1 as a similar analysis model for a target analysis model of a model ID=3 in Step S35. The similar model selecting section 202 selects the similar analysis model in Step S36 and acquires a pair of the target analysis model and the reference analysis model as an overlapping record pair in Step S37. In the overlapping record pair, an axial difference between the target analysis model and the reference analysis model is recorded.

Figure 9:
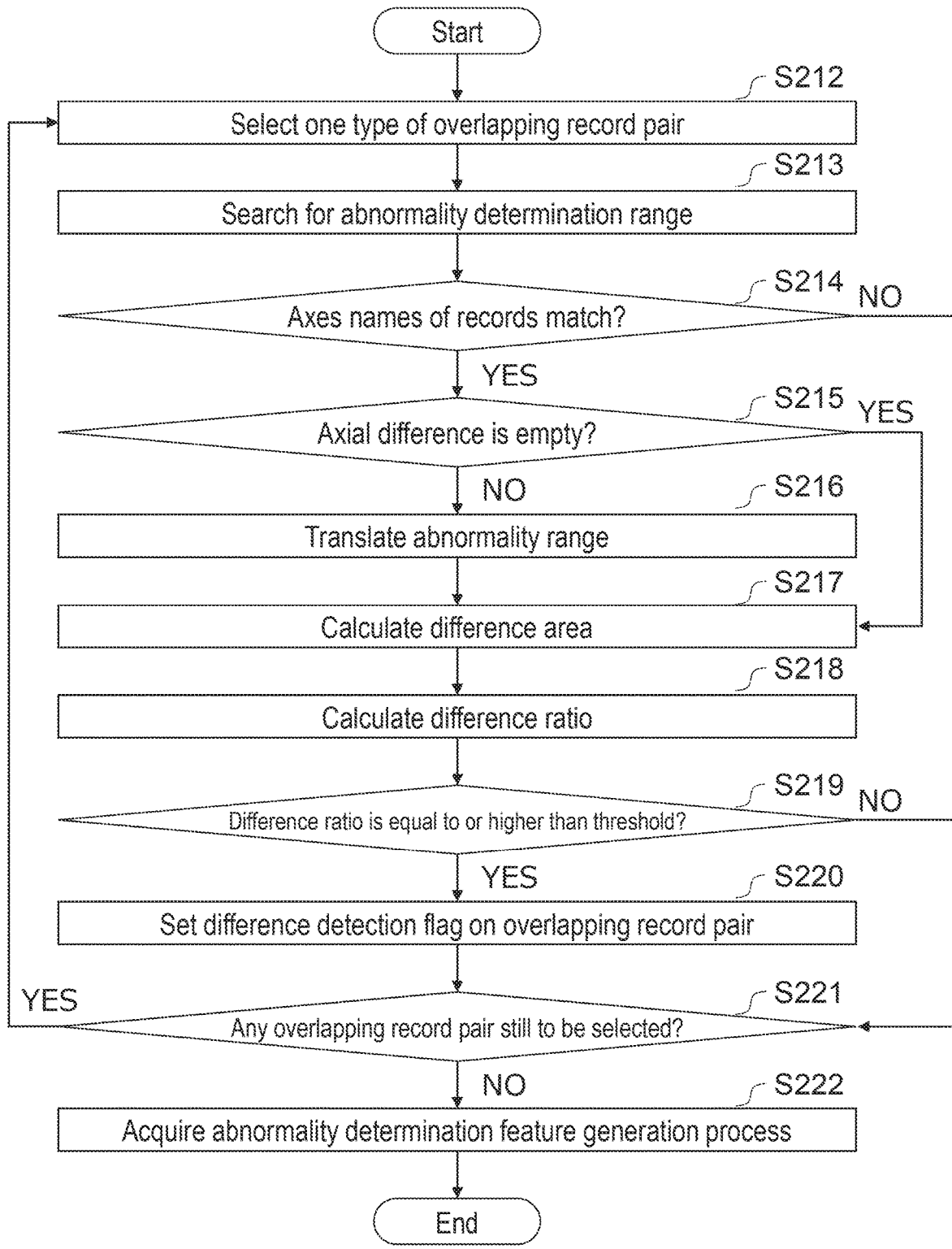
FIG. 9 is a flowchart of a process of extracting a similar analysis model with a large difference relative to the target analysis model shown in Step S38 in FIG. 7.

In Step S38, with use of the axial difference, the similar model selecting section 202 performs a process of calculating a difference area by summing up areas of non-overlapping ranges between the respective abnormality determination ranges of the target analysis model and the reference analysis model according to the axes whose axis names match (the common abnormality determination feature) (FIG. 9). In this example, a difference area regarding an abnormality determination feature referred to as "Amplitude (Constant)" is extracted. Then, since there is no similar analysis model still to be selected in Step S39, the similar model selecting section 202 outputs "Amplitude (Constant)" as an abnormality determination feature for which sufficient data has not been collected regarding the target analysis model, presenting it to a user in Step S40. In addition, the feature generation method for the abnormality determination feature may be presented to the user.

Figure 8:
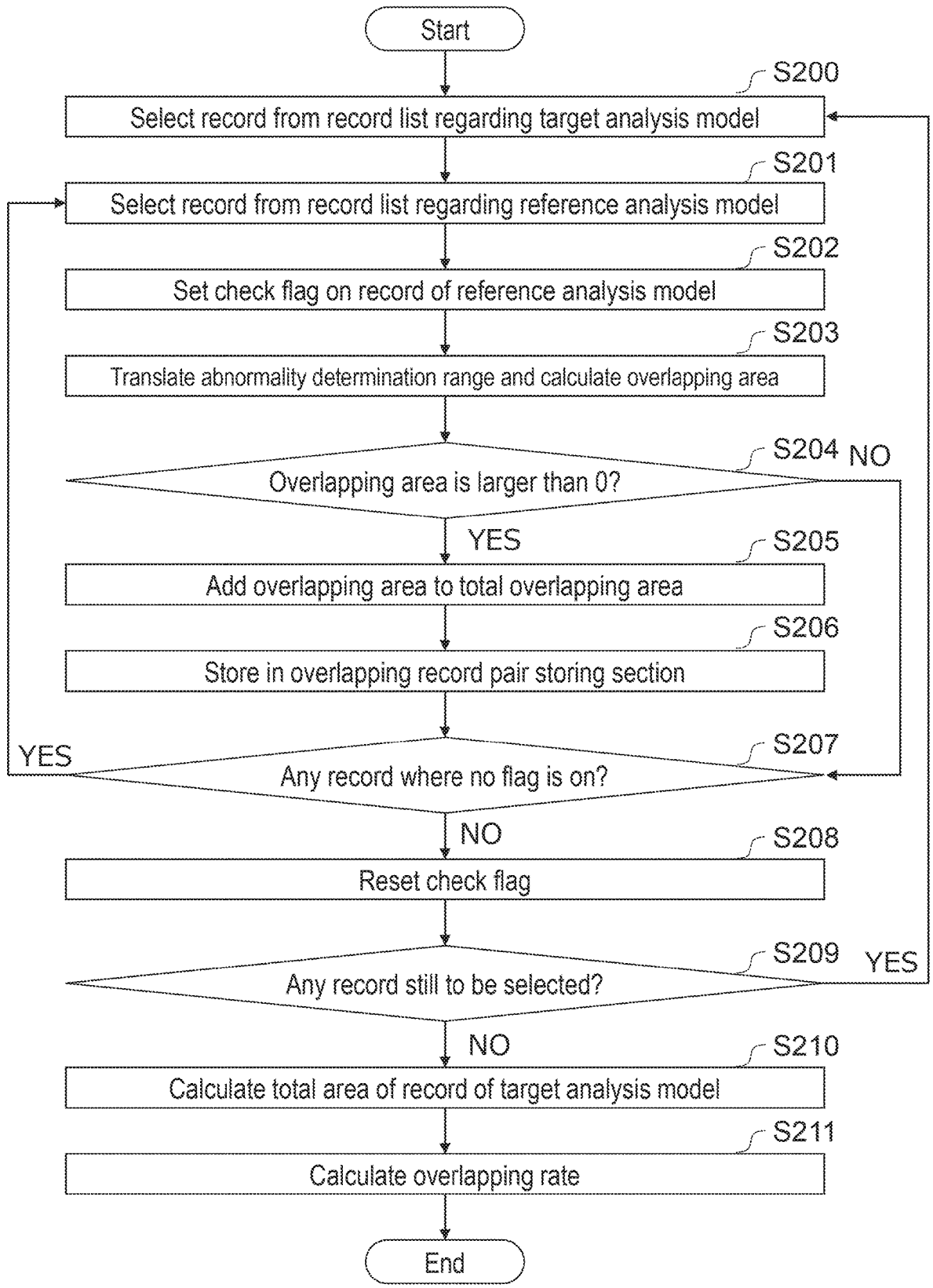
FIG. 8 is a flowchart of a process of calculating an overlapping rate between respective abnormality determination ranges of a target analysis model and a reference analysis model shown in Step S33 in FIG. 7.

FIG. 8 is a flowchart of a process of calculating an overlapping rate between abnormality determination ranges of the target analysis model and the reference analysis model shown in Step S33 in FIG. 7. For this process, the reference analysis model may be a similar analysis model.

The overlapping rate calculating section 203 selects one type of record from the record list of abnormality determination ranges regarding the target analysis model (Step S200). Furthermore, the overlapping rate calculating section 203 selects one type of record from the record list of abnormality determination ranges regarding the reference analysis model (Step S201). The overlapping rate calculating section 203 then sets a check flag on the acquired record regarding the reference analysis model, which shows that the record has been acquired (Step S202).

Subsequently, the overlapping rate calculating section 203 calculates an overlapping area between the target analysis model and the reference analysis model (Step S203). Specifically, the overlapping rate calculating section 203 first assigns the value of the axis start point indicated in the record of the reference analysis model to the axis start point of the target analysis model. Next, if the axis end point in the record of the target analysis model is empty, the overlapping rate calculating section 203 subtracts the axis start point of the reference analysis model from the axis start point in the record of the target analysis model and assigns a value given by the subtraction to the axis end point of the target analysis model. Empty means that no value exists. Furthermore, the overlapping rate calculating section 203 calculates a product of an axis overlapping length and an abnormality determination range overlapping length and defines the resulting value as the overlapping area between the target analysis model and the reference analysis model.

In this example, the axis overlapping length is a length of an overlapping part on the axis between the records of the target analysis model and the reference analysis model. The axis overlapping length is calculated as follows.

(a) Unless either the axis end point in the record of the target analysis model or the axis end point in the record of the reference analysis model is empty (no value exists), the axis overlapping length is calculated by Expression (1).

$$\text{Axis overlapping length} = \text{MIN}(axis\_x.\text{ tail}, axis\_y.\text{ tail}) - \text{MAX}(axis\_x.\text{ head}, axis\_y.\text{ head}) \quad (1)$$

In Expression (1), MIN(x, y) denotes a function that returns one of x and y with a smaller value. MAX(x, y) denotes a function that returns one of x and y with a larger value. axis_x. tail denotes a value of the axis end point in the record of the target analysis model. axis_y. tail denotes a value of the axis end point in the record of the reference analysis model. axis_x. head denotes a value of the axis start point in the record of the target analysis model. axis_y. head denotes a value of the axis start point in the record of the reference analysis model.

(b) If only either one of the axis end point in the record of the target analysis model or the axis end point in the record of the reference analysis model is empty (no value exists) and a value of the axis start point in the record with the axis end point being not empty is at least that of the axis start point and at most that of the axis end point in the other record, the axis overlapping length=1.

(c) If the axis end point in the record of the target analysis model and the axis end point in the record of the reference analysis model are both empty and the respective axis start points match each other, the axis overlapping length=1.

(d) If none of the above (a) to (c) applies, the axis overlapping length=0.

Furthermore, in this example, the abnormality determination range overlapping length is, regarding a specific interval or points in a specific abnormality determination feature, a length of a part where the respective abnormality determination ranges of the target analysis model and the reference analysis model overlap. The abnormality determination range overlapping length is calculated by Expression (2).

Abnormality determination range overlapping length=MIN(region_x. tail, region_y. tail)−MAX (region_x. head, region_y. head)　　　(2)

In Expression (2), region_x. tail denotes an abnormality range end point in the record of the target analysis model. region_y. tail denotes an abnormality range end point in the record of the reference analysis model. region_x. head denotes an abnormality range start point in the record of the target analysis model. region_y. head denotes an abnormality range start point in the record of the reference analysis model. The abnormality range start point refers to a start point of the abnormality determination range.

In Step S204, the overlapping rate calculating section 203 determines whether the overlapping area is larger than 0. If the overlapping area is larger than 0 (Step S204: YES), the overlapping rate calculating section 203 adds the overlapping area to a total overlapping area (Step S205). Furthermore, the overlapping rate calculating section 203 registers the model ID of the target analysis model, the model ID of the reference analysis model, and the axial difference in the overlapping record pair storing section 34 respectively as an original record ID 340, a destination record ID 341, and an axial difference 342 (Step S206).

After performing Step S206 or if the overlapping area is 0 or less in Step S204, the overlapping rate calculating section 203 determines whether there is any record with no check flag on in the record list of reference analysis models. A record with no check flag on is a record still to be selected in Step S201. If there is a record with no check flag on in the record list of reference analysis models (Step S207: YES), the overlapping rate calculating section 203 returns to Step S201, selecting the record with no check flag on.

If there is no record with no check flag on in the record list of reference analysis models (Step S207: NO), the overlapping rate calculating section 203 resets all the check flags in the record list of reference analysis models (Step S208). Furthermore, the overlapping rate calculating section 203 determines whether there is any record still to be selected from the record list of target analysis models in Step S200 (Step S209). If there is a record still to be selected in the record list of target analysis models, the overlapping rate calculating section 203 returns to Step S200, selecting the record still to be selected.

If there is no record still to be selected in the record list of target analysis models in Step S209, the overlapping rate calculating section 203 calculates a model area of the record list of target analysis models (Step S210). In this example, the model area is a sum of respective products of axis lengths and abnormality determination range lengths in all the records of the target analysis models. Each of the axis lengths is a length from the axis start point to the axis end point. It should be noted that if the axis end point is empty, the axis length is 1. Each of the abnormality determination range lengths is a length from the abnormality range start point to the abnormality range end point.

Furthermore, the overlapping rate calculating section 203 defines a value given by dividing the above total overlapping area by the above mode 1 area as the overlapping rate (Step S211).

A specific example of the process of calculating the overlapping rate between the target analysis model and the similar analysis model is given below.

In this example, the model ID of the target analysis model is 3 and the model ID of the reference analysis model is 1. Meanwhile, the records whose IDs are 1, 2, and 3 regarding the abnormality determination ranges for the three analysis models are as shown in FIG. 14. In other words, regarding abnormality determination ranges of the reference analysis model whose model ID is 1, there are three records whose IDs are 1, 2, and 3 shown in FIG. 14. Regarding the abnormality determination ranges of the target analysis model whose model ID is 3, there are records whose IDs are 5 and 6 shown in FIG. 14.

First, in Step S200, the overlapping rate calculating section 203 selects the record with the ID of 5 as a record of the target analysis model from the record list shown in FIG. 14. Subsequently, in Step S201, the overlapping rate calculating section 203 selects the record with the ID of 1 as a record of the reference analysis model from the record list shown in FIG. 14. Then, in Step S202, the overlapping rate calculating section 203 sets a check flag on the record with the ID of 1.

In Step S203, since a value of the axis start point of the record with the ID of 5 is 10 Hz while a value of the axis start point of the record with the ID of 1 is 20 Hz in the list of abnormality determination ranges shown in FIG. 14, the overlapping rate calculating section 203 causes the abnormality range translating section 204 to assign 20 Hz to the value of the axis start point of the record with the ID of 5 for translation of the abnormality determination range. The overlapping rate calculating section 203 then calculates an overlapping area between the translated abnormality determination range of the record with the ID of 5 and the abnormality determination range of the record with the ID of 1. In this example, the calculated overlapping area is MIN (40, 30)−MAX(10, 10)=20.

The overlapping rate calculating section 203 proceeds to Step S205, since the overlapping area is determined to be larger than 0 in Step S204. In Step S205, the overlapping rate calculating section 203 adds the currently calculated overlapping area, i.e., 20, to the total overlapping area having been stored. Subsequently, in Step S206, the overlapping rate calculating section 203 registers an entry of an overlapping record pair in the overlapping record pair storing section 34.

FIG. 15 is a diagram showing an example of data stored in the overlapping record pair storing section 34. In the overlapping record pair storing section 34, a relationship between respective abnormality determination features of two analysis models such as the target analysis model and the reference analysis model is shown. The abnormality determination feature of one of the analysis models is shown as an original record and the abnormality determination feature of the other analysis model is shown as a destination record. In this example, the abnormality determination feature of the target analysis model is shown as the original record and the abnormality determination feature of the reference analysis model is shown as the destination record. Registered in the overlapping record pair storing section 34 are a plurality of entries each including an original record ID 340, a destination record ID 341, and an axial difference 342. The original record ID 340 refers to an identification number for identifying each of the records (original records) of the abnormality determination ranges regarding the target analysis model. The destination record ID 341 refers to an identification number for identifying each of the records (destination records) of the abnormality determination ranges regarding the reference analysis model. The axial difference 342 refers to a difference between the values under the axis start point 333 of the abnormality determination features regarding these two types of records. In this example, the original record and the destination record refer to the records stored in the abnormality determination range storing section 33 and such records are also referred to as abnormality determination range records. For example, regarding an abnormality determination range record with an ID of 1 and an abnormality determination range record with an ID of 5 in FIG. 14, a difference between the axis starts points of these two types of records may be 10 Hz. In this case, an entry is registered in the overlapping record pair storing section 34 of FIG. 15, where "1" is entered under the original record ID 340, "5" is entered under the destination record ID 341, and "10 Hz" is entered under the axial difference 342.

In the process of FIG. 8, the overlapping rate calculating section 203 subsequently registers an entry where the original record ID is 1, the destination record ID is 5, and the axial difference is 10 Hz in the overlapping record pair storing section 34 in Step S206 as shown in FIG. 15. The axial difference of 10 Hz stored in the overlapping record pair storing section 34 is a value given by subtracting the axis start point of the record with the ID of 5 from the value of the axis start point of the record with the ID of 1.

Regarding the reference analysis model whose model ID is 1, the record with the ID of 2 and the record with the ID of 3 remain unselected in the list of abnormality determination ranges of FIG. 14. Accordingly, since the determination result in the Step S207 is YES, the overlapping rate calculating section 203 performs the above process from Step S201 to Step S206 on the record with the ID of 2. In addition, the overlapping rate calculating section 203 also performs the above process from Step S201 to Step S206 on the record with the ID of 3. As a result, the total overlapping area is 50. In subsequent Step S207, all the abnormality determination ranges of the reference analysis model whose model ID is 1 have been selected, that is, the check flags are set on the records whose IDs are 1, 2, and 3 in FIG. 14, so that the overlapping rate calculating section 203 proceeds to Step S208, resetting the check flags such that no check flag is on.

Next, since the record with the ID of 6 remains unselected as a record of an abnormality determination range of the target analysis model in Step S209, the overlapping rate calculating section 203 proceeds to Step S200. The overlapping rate calculating section 203 thus selects the record with the ID of 6 in Step S200, performs a process identical or similar to the process performed on the record with the ID of 5 before, and terminates the process, then proceeding to Step S210.

In Step S210, the overlapping rate calculating section 203 calculates the areas of the abnormality determination ranges regarding the record with the ID of 5 regarding the abnormality determination range and the record with the ID of 6 of the abnormality determination range, and calculates a sum of the areas, i.e. the model area. In this case, since the axis end points of both records are empty, the axis length is 1. Thus, the model area is (40−10)+(40−10)=60. The overlapping rate calculating section 203 then divides the total overlapping area=50 by the model area=60, giving an overlapping rate of 83% in Step S211 and terminates the process.

FIG. 9 is a flowchart of a process of extracting a similar analysis model with a large difference relative to the target analysis model shown in Step S38 in FIG. 7.

The abnormality range difference calculating section 206 acquires information of the overlapping record pairs acquired in Step S37 from the similar model selecting section 202 and selects one type of overlapping record pair from among the overlapping record pairs (Step S212). Subsequently, the abnormality range difference calculating section 206 searches the abnormality determination range storing section 33 by using the original record ID 340 and the destination record ID 341 of the selected overlapping record pair as a key, identifying the corresponding record (Step S213). In other words, a record with the model ID 331 matching the original record ID 340 or the destination record ID 341 is identified from among the records stored in the abnormality determination range storing section 33. Hereinafter, the record of the abnormality determination range with the model ID 331 matching the original record ID 340 is referred to as the original record and the record of the abnormality determination range with the model ID 331 matching the destination record ID 341 is referred to as the destination record.

Subsequently, the abnormality range difference calculating section 206 determines whether the axis names of the original record and the destination record match each other (Step S214). If the axis names of the original record and the destination record match each other, the abnormality range difference calculating section 206 determines whether the axial difference between the overlapping record pair selected in Step S212 is empty (Step S215). If the axial difference is not empty, the abnormality range difference calculating section 206 translates the abnormality determination range (Step S216). Specifically, the translation of the abnormality determination range is a process of adding a value of the axial difference to the axis start point of the original record and, if the axis end point of the original record is not empty, adding the value of the axial difference to the axis end point.

Next, the abnormality range difference calculating section 206 obtains model areas regarding the original record and the destination record, computes a sum of the model areas, and calculates a difference area by subtracting an overlapping area between the original record and the destination record from the sum of the areas (Step S217). In a case where the axis end point is empty, a value per axis of each of the model axes is a value given by subtracting the abnormality range start point from the abnormality range end point. In a case where the axis end point is not empty, the value per axis of each of the model areas is a product of the value given by subtracting the axis start point from the axis end point and a value given by subtracting the abnormality range start point from the abnormality range end point. It should be noted that since the difference area is calculated in Step S203, the difference area calculated in Step S203 may be used in Step S217.

The abnormality range difference calculating section 206 divides the difference area calculated in Step S217 by the area of the original record, calculating a difference ratio (Step S218). Subsequently, the abnormality range difference calculating section 206 determines whether the difference ratio is equal to or more than a predetermined threshold (Step S219).

If the difference ratio is equal to or more than the threshold, the abnormality range difference calculating section 206 sets a differenced detection flag on the destination record as the similar analysis model corresponding to the destination record has a large difference relative to the target analysis model corresponding to the original record (Step S220) and proceeds to Step S221. If the difference ratio is not equal to or more than the threshold, the abnormality range difference calculating section 206 proceeds to Step S221. The abnormality range difference calculating section 206 then determines whether there is any overlapping record pair still to be selected in Step S221. If there is an overlapping record pair still to be selected, the abnormality range difference calculating section 206 proceeds to Step S212.

If there is no overlapping record pair still to be selected, in Step S222, the abnormality range difference calculating section 206 acquires the destination record with the difference detection flag that indicates a similar analysis model with a large difference relative to the target analysis model and the destination record with an ID that is not included in the destination record IDs of the overlapping record pairs, searches the feature generation process storing section 30 by using the axis name of each of the acquired destination records as a key, and identifies a record with the abnormality determination feature that matches the axis name. Furthermore, the abnormality range difference calculating section 206 acquires information of the basic form from the record identified by searching in the feature generation process storing section 30, outputs the axis name, i.e., the abnormality determination feature, the axis start point and axis end point of the axis, and the basic form of the order of applying functions to the abnormality determination feature, and terminates the process.

If the axis name of the original record does not match that of the destination record in Step S214, the abnormality range difference calculating section 206 proceeds to Step S221, performing the process of Step S221 and steps subsequent thereto. Meanwhile, if the axial difference is empty in Step S215, the abnormality range difference calculating section 206 proceeds to Step S217, performing the processes of Step S217 and steps subsequent thereto.

A specific example of a process of extracting a similar analysis model with a large difference relative to the target analysis model is given below.

In Step S212, the abnormality range difference calculating section 206 selects a record where "1" is entered under the original record ID 340, "5" is entered under the destination record ID 341, and "10 Hz" is entered under the axial difference 342 from the list of the overlapping record pairs of FIG. 15. Furthermore, in Step S213, the abnormality range difference calculating section 206 identifies a record with the ID of 1 and a record with the ID of 5 from the abnormality determination range storing section 33 shown in FIG. 14. Referring to FIG. 14, the axis names of these records, which are both "Frequency (Constant)", match each other and the axial difference is not empty, so that the abnormality range difference calculating section 206 proceeds to Step S216.

In Step S216, the abnormality range difference calculating section 206 adds the axial difference of 10 Hz to the axis start point of 10 Hz of the record with the ID of 5 of the abnormality determination range. Furthermore, in Step S217, the abnormality range difference calculating section 206 calculates a difference area between the record with the ID of 1 of the abnormality determination range and the record with the ID of 5 of the abnormality determination range. The calculated difference area is (40−10)−(30−10) =10.

In Step S218, the abnormality range difference calculating section 206 calculates the difference ratio=10/(40−10)=0.33. In this example, since the difference ratio is less than the threshold of 60%, the abnormality range difference calculating section 206 proceeds to Step S221. In Step S222, the abnormality range difference calculating section 206 acquires the axis name "Amplitude (Constant)" of a record with the ID of 3 regarding the abnormality determination range, since the ID of this record is not included in the destination record IDs of the overlapping record pairs. The abnormality range difference calculating section 206 then searches the feature generation process storing section 30 by using the axis name "Amplitude (Constant)" as a key, acquiring a basic form "MAX" of the abnormality determination feature that matches this axis name. The abnormality range difference calculating section 206 then outputs information of "Amplitude (Constant)", "5 dB", "10 dB", and "MAX" and terminates the process.

As described above, the abnormality range translating section 204 of the overlapping rate calculating section 203 and the abnormality range difference calculating section 206 perform the process of translating the abnormality determination range. In the present embodiment, the abnormality determination range may be, without limitation, displayed on a screen so that a user can see a state of the translation of the abnormality determination range. The state of the translation of the abnormality determination range is described below.

Figure 18:
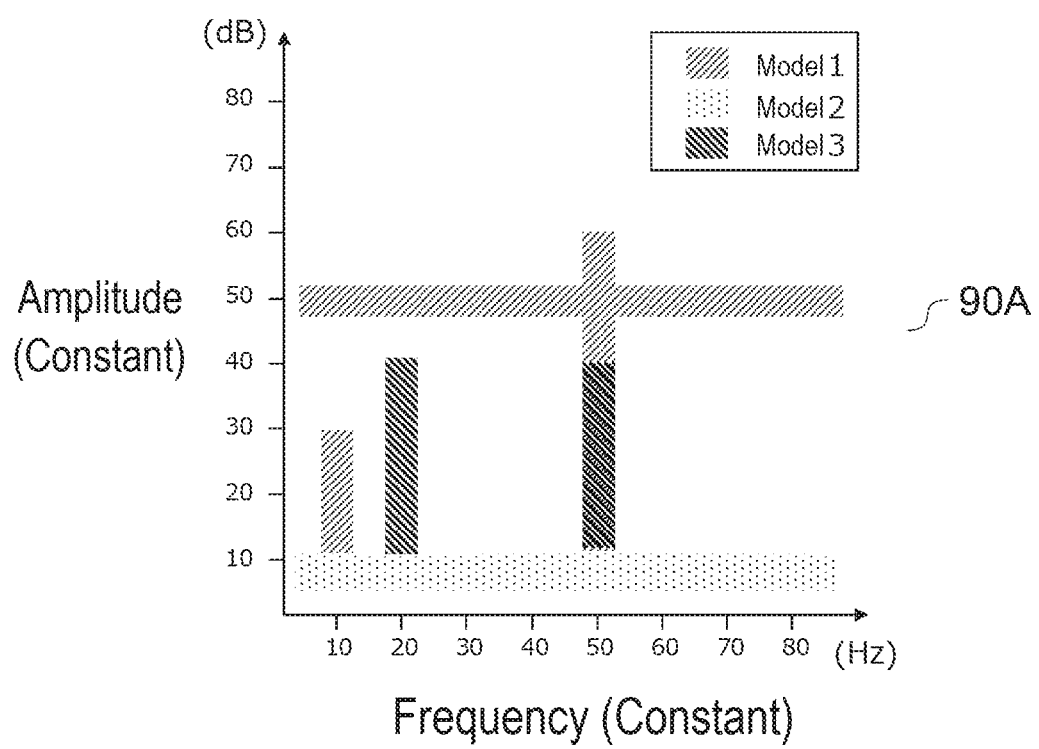
FIG. 18 is a diagram showing an example of a screen image that shows an untranslated abnormality determination range.
Figure 19:
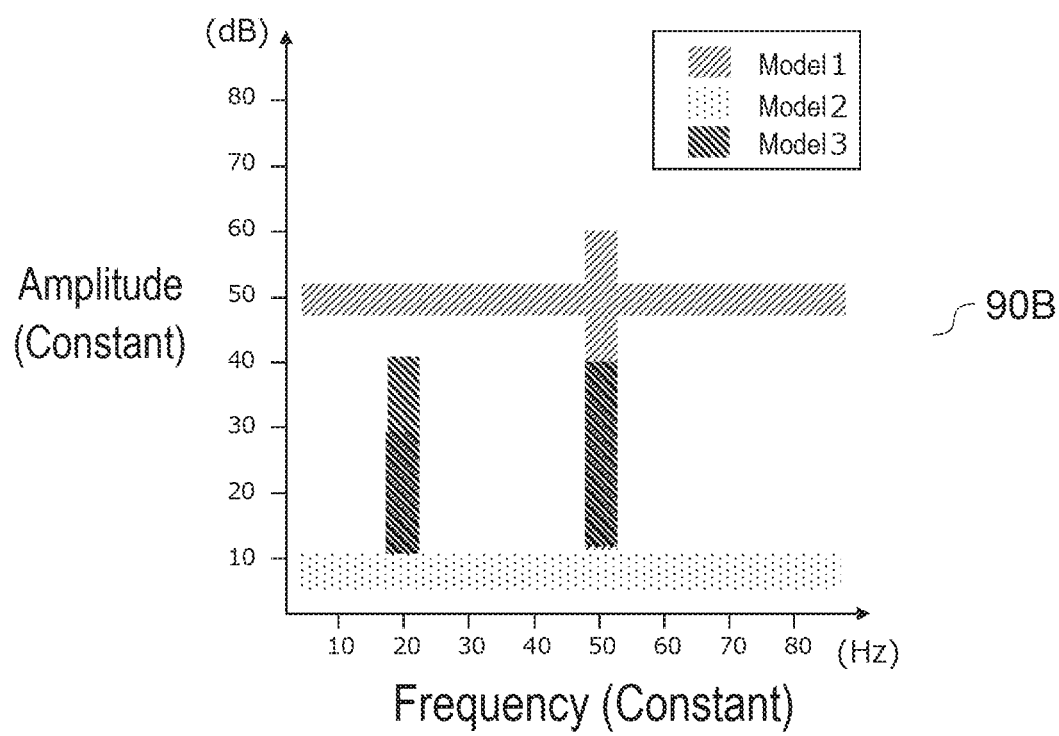
FIG. 19 is a diagram showing an example of a screen image that shows a translated abnormality determination range.

FIG. 18 is a diagram showing an example of a screen image that shows an untranslated abnormality determination range. FIG. 19 is a diagram showing an example of a screen image that shows a translated abnormality determination range. In each of FIG. 18 and FIG. 19, the abnormality determination range is shown in the form of a hatched range in a graph where an abscissa axis represents a constant frequency and an ordinate axis represents a constant amplitude.

Referring to an abnormality determination range 90A in FIG. 18, an analysis model 1 has abnormality determination ranges defined at a range where Frequency (Constant) is equal to or near 50 Hz and Amplitude (Constant) is from 10 dB to 60 dB, a range where Frequency (Constant) is from 3 Hz to 90 Hz and Amplitude (Constant) is equal to or near 50 dB, and a range where Frequency (Constant) is equal to or near 10 Hz and Amplitude (Constant) is from 10 dB to 30 dB. An analysis model 2 has an abnormality determination range defined at a range where Frequency (Constant) is from 3 Hz to 90 Hz and Amplitude (Constant) is from 4 dB to 10 dB. An analysis model 3 has abnormality determination ranges defined at a range where Frequency (Constant) is equal to or near 20 Hz and Amplitude (Constant) is from 10 dB to 40 dB and a range where Frequency (Constant) is equal to or near 50 Hz and Amplitude (Constant) is from 10 dB to 40 dB.

As the range where Frequency (Constant) is equal to or near 10 Hz and Amplitude (Constant) is from 10 dB to 30 dB is translated from the state in FIG. 18 in a direction of an axis of Frequency (Constant) by 10 Hz, the state of FIG. 19 is achieved. Referring to an abnormality determination range 90B in FIG. 19, unlike the abnormality determination range 90A in FIG. 18, the abnormality determination range of the analysis model 1 that was defined at the range where Frequency (Constant) is equal to or near 10 Hz and Amplitude (Constant) is, approximately, from 10 dB to 30 dB is translated to a range where Frequency (Constant) is equal to or near 20 Hz and Amplitude (Constant) is, approximately, from 10 dB to 30 dB.

Furthermore, the abnormality determination range creating section 201 registers the abnormality determination range of the target analysis model in the abnormality determination range storing section 33 as described above. In the present embodiment, without limitation, a user is allowed to register the abnormality determination range in the abnormality determination range storing section 33 while seeing and checking a screen image that shows information of the abnormality determination range of the target analysis model, etc.

Figure 20:
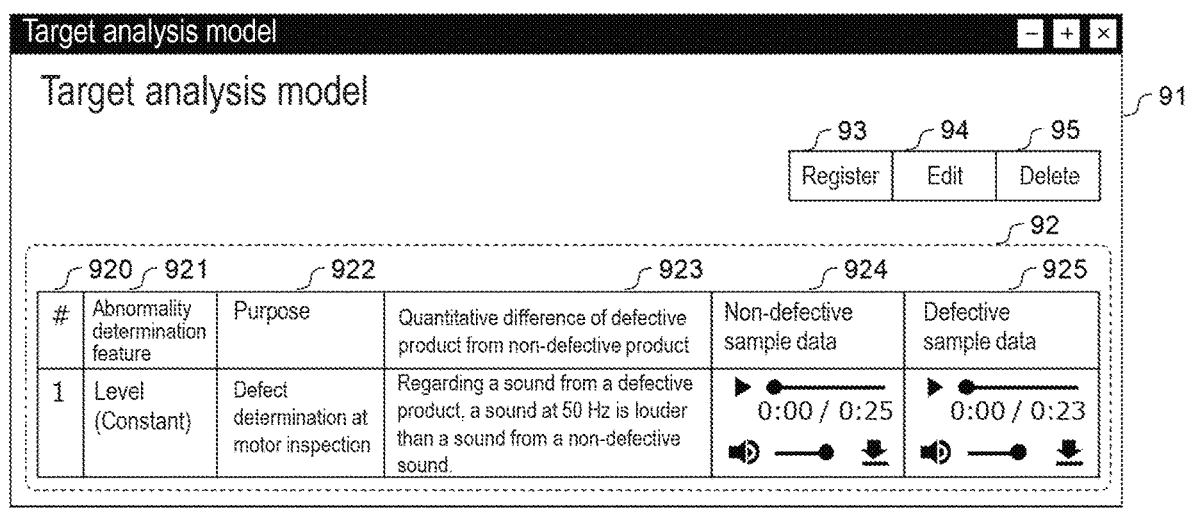
FIG. 20 is a diagram showing an example of a screen image appearing when the abnormality determination range of the target analysis model is to be registered.

FIG. 20 is a diagram showing an example of a screen image appearing when the abnormality determination range of the target analysis model is to be registered. A target analysis model display screen image 91 in FIG. 20 includes a detail display field 92, a registration button 93, an edit button 94, and a delete button 95.

The detail display field 92 is a field for displaying detail information of the target analysis model. The detail information contains a model ID 920, an abnormality determination feature 921, a purpose 922, a quantitative difference of a defective product from a non-defective product 923, non-defective sample data 924, and defective sample data 925. The model ID 920 is a field for entering the identification number of a target analysis model. The abnormality determination feature 921 is a field for entering the name of an abnormality determination feature for a target analysis model. The purpose 922 is a field for entering a use purpose of a target analysis model. The quantitative difference of a defective product from a non-defective product 923 is a field for entering a quantitative feature of a defective product. The non-defective sample data 924 is an operation field for trial listening and downloading of registered non-defective product data. The defective sample data 925 is an operation field for trial listening and downloading of registered defective product data. The registration button 93 is an operation button for registering detail information of a target analysis model in a system. The edit button 94 is an operation button that is to be clicked to edit information shown in the detail display field 92. The delete button 95 is an operation button for deleting registered information of a target analysis model.

Furthermore, in the present embodiment, the similar model selecting section 202 causes similar analysis models or reference analysis models to be displayed in a descending order of overlapping rates to the target analysis model as described above.

FIG. 21 is a diagram showing an example of a screen image that shows a list of similar analysis models according to the present embodiment. A similar model list display screen image 96 includes a similar model list display field 97. The similar model list display field 97 includes a check box 970, a similarity 971, an abnormality determination feature 972, a purpose 973, and a quantitative difference of a defective product from a non-defective product 974, a non-defective sample data 975, and a defective sample data 976.

The check box 970 is a check box for selecting a similar analysis model displayed in an abnormality determination feature list of a target analysis model. The similarity 971 is a field for displaying an overlapping rate relative to the target analysis model. The abnormality determination feature 972 is a field for displaying an abnormality determination feature of a similar analysis model. The purpose 973 is a field for displaying a use purpose of a similar analysis model. The quantitative difference of a defective product from a non-defective product 974 is a field for displaying a quantitative feature of a defective product. The non-defective sample data 975 is an operation field for trial listening and downloading of registered non-defective product data. The defective sample data 976 is an operation field for trial listening and downloading of registered defective product data.

Figure 22:
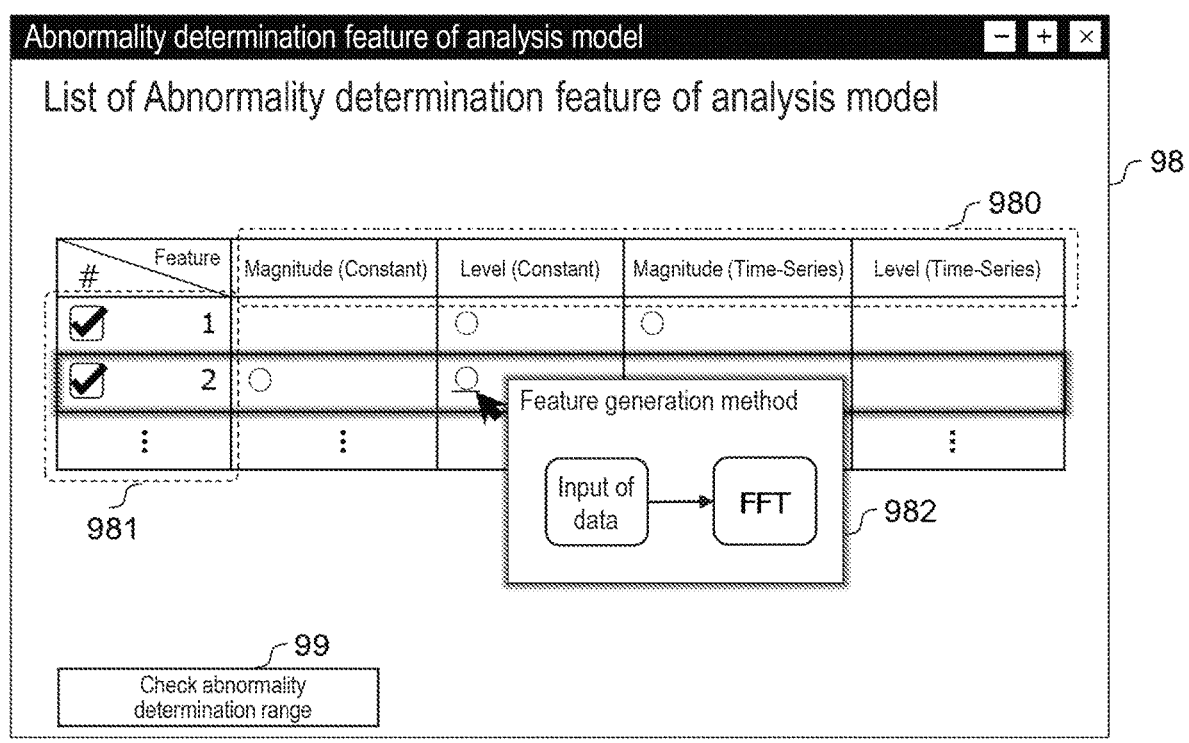
FIG. 22 is a diagram showing an example of a screen image that shows an abnormality determination feature list of analysis models according to the present embodiment.

Moreover, in the present embodiment, the analysis model interpretation apparatus 1 may display a list of information regarding abnormality determination features of analysis models. FIG. 22 is a diagram showing an example of a screen image that shows an abnormality determination feature list of analysis models according to the present embodiment. An abnormality determination feature list 98 of analysis models includes an abnormality determination feature list 980, a model list 981, a feature generation method 982, and an abnormality determination range check button 99. The abnormality determination feature list 980 shows a list of abnormality determination features. The model list 981 shows a list of the model IDs of analysis models. The abnormality determination range check button 99 is an operation button for displaying the abnormality determination range 90A of the selected analysis model. For a specific analysis model, when a user clicks a check box in the model list 981 to cause a check mark to appear and clicks the abnormality determination range check button 99, the abnormality determination feature list 98 of analysis models shows the abnormality determination range 90A of the analysis model with the check mark on.

The present embodiment is described above but the present invention is not limited only to these embodiments. These embodiments may be combined in use or the configurations may be partly modified within the scope of a technical idea of the present invention. Furthermore, the following contents are within the scope of the above present embodiment. However, the present embodiment is by no means limited to the following contents.

An analysis model interpretation apparatus 1, which is an analysis support apparatus configured to support data analysis, includes: a feature interpreting section configured to extract a feature from a target analysis model generated on a basis of vibration data and classify the feature into an abnormality determination feature, the abnormality determination feature being a feature that represents a vibration and enables determining whether abnormality occurs; an abnormality determination range creating section configured to identify a range to be determined to be abnormal of the abnormality determination feature of the target analysis model as an abnormality determination range; a similar model selecting section configured to calculate an overlapping degree that indicates how much the abnormality determination range of the target analysis model and an abnormality determination range of each of one or more predetermined reference analysis models overlap and select, on a basis of the overlapping degree, a similar analysis model that is similar to the target analysis model from among the reference analysis models; and an abnormality range difference calculating section configured to extract a difference between the abnormality determination range of the target analysis model and an abnormality determination range of the similar analysis model. This allows for classifying the feature of the target analysis model into the abnormality determination feature, which is a feature that represents vibration and enables determining whether abnormality occurs. Thus, it is possible to interpret the target analysis model by clear expression. Furthermore, by extracting a difference caused in the target analysis model relative to the similar analysis model possibly as a result of data still to be collected, it is possible to obtain information useful for improving the analysis model with consideration of detection of a defect pattern related to uncollected data. Examples of the feature that represents vibration include amplitude and frequency as in the present embodiment. The overlapping degree herein may be any index that indicates how much the respective abnormality determination ranges of the target analysis model and the reference analysis model overlap and the overlapping rate according to the present embodiment is an example of the overlapping degree. For example, the overlapping degree may be a percentage of a range that overlaps the abnormality determination range of the reference analysis model in the abnormality determination range of the target analysis model. Alternatively, the overlapping degree may be a percentage of a range that overlaps the abnormality determination range of the target analysis model in the abnormality determination range of the reference analysis model.

Furthermore, the abnormality determination range creating section may identify the abnormality determination range as a range in a multidimensional space where a plurality of abnormality determination features each correspond to an axis. In this case, since the abnormality determination range is identified as the range in the multidimensional space defined by the plurality of abnormality determination features and used for selection of a similar analysis model and extraction of a difference, it is possible to obtain information useful for detecting a defect pattern related to uncollected data in the multidimensional space. The frequency and amplitude of vibration sound are typical examples of the abnormality determination feature of a motor product.

Furthermore, the feature interpreting section may classify the feature into the abnormality determination feature on the basis of a function being applied to the feature and an order of the application. In this case, since the feature is classified into the abnormality determination feature on the basis of a function being applied to the feature and an order of the application, it is possible to more appropriately classify the feature mount according to characteristics of calculation to the feature.

Furthermore, the feature interpreting section may classify the feature into abnormality determination features including amplitude and frequency. By classifying the feature of the target analysis model into the abnormality determination features that represent vibration, such as amplitude and frequency, it is possible to interpret the target analysis model in clear expression.

Furthermore, the feature interpreting section may classify the feature into abnormality determination features further including a time-series change in at least one of amplitude or frequency. Since the feature of the target analysis model is classified into the abnormality determination features that represents vibration, such as amplitude, frequency, and a time-series change in at least one of amplitude or frequency, it is possible to interpret the target analysis model by clear expression with use of an index that changes with time in addition to a constant index.

Furthermore, the abnormality determination range creating section may identify the abnormality determination range of the target analysis model by inputting sample data including the value of the variable and registering the value of the variable of the sample data in the abnormality determination range if the sample data is determined to be abnormal. By inputting sample data to the target analysis model, it is possible to easily identify the abnormality determination range.

Furthermore, after translating the abnormality determination range of the target analysis model in the direction of the axis, the similar model selecting section may calculate the overlapping degree to allow the start point of the abnormality determination range of the target analysis model defined by the axis of the abnormality determination feature to match the start point of the abnormality determination range of the similar analysis model defined by this axis. It is possible to appropriately select the similar analysis model even when the defect patterns of the target analysis model and the reference analysis model are deviated in the axial direction of the abnormality determination feature.

Furthermore, the similar model selecting section may rank the similar analysis model for the target analysis model in a descending order of the overlapping degree. By giving priority to the similar analysis model with a higher overlapping degree, it is possible to present information useful for improvement of the analysis model.

Furthermore, the analysis support apparatus may further include a display unit that displays information of the similar analysis model that is similar to the target analysis model while sorting the similar analysis model in a descending order of the overlapping degree.

Furthermore, the display unit may display information regarding the difference of the similar analysis model.

Furthermore, the analysis model interpretation apparatus 1, or the analysis support apparatus, may include a processor and a storage unit and execute a software program stored in the storage unit, thereby implementing the sections described as an internal configuration of the processor 5 with reference to FIG. 2.

What is claimed is:

1. An analysis support apparatus configured to support data analysis, the analysis support apparatus comprising:
at least one processor; and
software configured to, when executed by the at least one processor,
analyze code of a software program, used to create a target analysis model generated based on vibration data for a motor, to identify one or more variables in the code and one or more functions used to produce values of the one or more variables in the code,
classify at least one of the one or more variables into an abnormality determination feature based on at least one of the one or more functions used to produce a value of the at least one variable in the code, the abnormality determination feature representing a vibration and enabling a determination of whether an abnormality occurs in the motor,
identify an abnormality determination range that indicates a range of abnormal values of the abnormality determination feature of the target analysis model,
calculate an overlapping degree that indicates how much the abnormality determination range of the target analysis model and an abnormality determination range of each of one or more predetermined reference analysis models overlap,
based on the overlapping degree, selected one or more similar analysis models that are similar to the target analysis model from among the reference analysis models,
extract a difference between the abnormality determination range of the target analysis model and an abnormality determination range of each of the one or more similar analysis models, and
display the one or more similar analysis models in descending order of the overlapping degrees that were calculated for the one or more similar analysis models.

2. The analysis support apparatus according to claim 1, wherein the software is configured to identify the abnormality determination range as a range in a multidimensional space where a plurality of abnormality determination features each corresponds to an axis, the plurality of abnormality determination features including the abnormality determination feature.

3. The analysis support apparatus according to claim 1, wherein the software is configured to classify the at least one variable into the abnormality determination feature based on the at least one function and an order of application of the at least one function in the code.

4. The analysis support apparatus according to claim 1, wherein the abnormality determination feature represents an amplitude or frequency.

5. The analysis support apparatus according to claim 4, wherein the abnormality determination feature represents a time-series change in at least one of the amplitude or the frequency.

6. The analysis support apparatus according to claim 1, wherein the software is configured to identify the abnormality determination range of the target analysis model by inputting sample data including a value of the at least one variable to the target analysis model and registering the value of the at least one variable of the sample data in the abnormality determination range if the sample data is determined to be abnormal.

7. The analysis support apparatus according to claim 1, wherein the software is configured to calculate the overlapping degree after translating the abnormality determination range of the target analysis model, along an axis representing the abnormality determination feature, to match a start point of the abnormality determination range of the target analysis model on the axis to a start point of the abnormality determination range of the similar analysis model on the axis.

8. The analysis support apparatus according to claim 1, wherein the software is configured to rank the one or more similar analysis models in the descending order of the overlapping degrees.

9. The analysis support apparatus according to claim 1, further comprising a display unit configured to display the one or more similar analysis model in the descending order of the overlapping degrees.

10. The analysis support apparatus according to claim 1, wherein the software is configured to display information regarding the differences extracted for each of the one or more similar analysis models.

11. A computer-executable analysis support method for supporting analysis of vibration data, the analysis support method comprising:
analyzing code of a software program, used to create a target analysis model generated based on vibration data for a motor, to identify one or more variables in the code and one or more functions used to produce values of the one or more variables in the code;
classifying at least one of the one or more variables into an abnormality determination feature based on at least one of the one or more functions used to produce a value of the at least one variable in the code, the abnormality determination feature representing a vibration and enabling a determination of whether an abnormality occurs in the motor;
identifying an abnormality determination range that indicates a range of abnormal values of the abnormality determination feature of the target analysis model;
calculating an overlapping degree that indicates how much the abnormality determination range of the target analysis model and an abnormality determination range of each of one or more predetermined reference analysis models overlap;
based on the overlapping degree, selecting one or more similar analysis models that are similar to the target analysis model from among the reference analysis models;
extracting a difference between the abnormality determination range of the target analysis model and an abnormality determination range of each of the one or more similar analysis models; and
displaying the one or more similar analysis models in descending order of the overlapping degrees that were calculated for the one or more similar analysis models.

12. A non-transitory computer-readable medium containing a computer-executable analysis support program for supporting analysis of vibration data, the analysis support program comprising:
analyzing code of a software program, used to create a target analysis model generated based on vibration data for a motor, to identify one or more variables in the code and one or more functions used to produce values of the one or more variables in the code;
classifying at least one of the one or more variables into an abnormality determination feature based on at least one of the one or more functions used to produce a value of the at least one variable in the code, the abnormality determination feature representing a vibration and enabling a determination of whether an abnormality occurs in the motor;
identifying an abnormality determination range that indicates a range of abnormal values of the abnormality determination feature of the target analysis model;
calculating an overlapping degree that indicates how much the abnormality determination range of the target analysis model and an abnormality determination range of each of one or more predetermined reference analysis models overlap;
based on the overlapping degree, selecting one or more similar analysis models that are similar to the target analysis model from among the reference analysis models;
extracting a difference between the abnormality determination range of the target analysis model and an abnormality determination range of each of the one or more similar analysis models; and
displaying the one or more similar analysis models in descending order of the overlapping degrees that were calculated for the one or more similar analysis models.

* * * * *